United States Patent
Cho et al.

(10) Patent No.: US 10,416,722 B2
(45) Date of Patent: Sep. 17, 2019

(54) ELECTRONIC DEVICE HAVING FLEXIBLE DISPLAY

(71) Applicant: Samsung Electronics Co., Ltd., Suwon-si, Gyeonggi-do (KR)

(72) Inventors: Kyu-hyun Cho, Suwon-si (KR); Hee-seok Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/012,256

(22) Filed: Feb. 1, 2016

(65) Prior Publication Data
US 2017/0023978 A1 Jan. 26, 2017

(30) Foreign Application Priority Data
Jul. 20, 2015 (KR) .................. 10-2015-0102517

(51) Int. Cl.
*G06F 1/16* (2006.01)
*H04M 1/02* (2006.01)

(52) U.S. Cl.
CPC ........ *G06F 1/1652* (2013.01); *H04M 1/0268* (2013.01)

(58) Field of Classification Search
CPC .. G06F 1/1652; H04M 1/0268; H04M 1/0237
See application file for complete search history.

(56) References Cited

U.S. PATENT DOCUMENTS

| | | | | |
|---|---|---|---|---|
| 3,718,301 A | * | 2/1973 | Morton ................. | G03B 17/30 242/343.2 |
| 5,544,833 A | * | 8/1996 | Zander ................. | G03B 17/30 242/348 |
| 6,016,176 A | * | 1/2000 | Kim ................. | G02F 1/133305 349/158 |
| 6,498,597 B1 | * | 12/2002 | Sawano ................. | G09F 11/29 345/107 |

(Continued)

FOREIGN PATENT DOCUMENTS

| | | |
|---|---|---|
| GB | 2508194 A | 5/2014 |
| KR | 10-2014-0062006 A | 5/2014 |
| KR | 10-2014-0144029 A | 12/2014 |

OTHER PUBLICATIONS

Government of India; Indian Patent Office Examination Report; dated Nov. 2, 2018; pp. 1-4; Application No. 201624005041; India.

*Primary Examiner* — David M Sinclair
*Assistant Examiner* — Theron S Milliser
(74) *Attorney, Agent, or Firm* — Jefferson IP Law, LLP

(57) ABSTRACT

An electronic device is provided. The electronic device includes a housing having an opening, a roll installed in the housing, a flexible display configured to be wound on the roll and to be withdrawn from the housing through the opening in accordance with a rotating direction of the roll. The electronic device further includes moveable housing parts and a housing guide configured to guide and retract at least one part of the housing as space within the housing becomes available due to withdrawal of the flexible display, (Continued)

so that a height, width and/or overall size of the housing is reduced when the flexible display is withdrawn through the opening and extended outside of the housing.

17 Claims, 22 Drawing Sheets

(56) References Cited

U.S. PATENT DOCUMENTS

| | | | | |
|---|---|---|---|---|
| 7,746,293 | B2* | 6/2010 | Kobayashi | G09F 9/33 |
| | | | | 345/204 |
| 8,605,421 | B2* | 12/2013 | Verschoor | G06F 1/1652 |
| | | | | 361/679.21 |
| 9,098,241 | B1* | 8/2015 | Cho | H05K 1/028 |
| 9,473,839 | B2* | 10/2016 | Yu | H04R 1/028 |
| 9,625,946 | B2* | 4/2017 | Lee | G06F 1/1652 |
| 2005/0041012 | A1 | 2/2005 | Daniel et al. | |
| 2006/0125391 | A1 | 6/2006 | Aksamit et al. | |
| 2006/0166713 | A1* | 7/2006 | Yeh | G06F 1/1626 |
| | | | | 455/575.1 |
| 2008/0049003 | A1* | 2/2008 | Hasegawa | G06F 1/1615 |
| | | | | 345/206 |
| 2010/0084536 | A1* | 4/2010 | Cvek | A47B 21/007 |
| | | | | 248/404 |
| 2010/0164837 | A1* | 7/2010 | Kao | G06F 1/1616 |
| | | | | 345/1.3 |
| 2010/0164973 | A1* | 7/2010 | Huitema | G06F 1/1615 |
| | | | | 345/581 |
| 2010/0177020 | A1 | 7/2010 | Bemelmans et al. | |
| 2013/0127917 | A1 | 5/2013 | Kwack et al. | |
| 2014/0002430 | A1 | 1/2014 | Kwack et al. | |
| 2014/0247544 | A1 | 9/2014 | Ryu | |
| 2015/0009636 | A1* | 1/2015 | Jeong | B65H 18/10 |
| | | | | 361/749 |
| 2015/0029229 | A1* | 1/2015 | Voutsas | G06F 1/1652 |
| | | | | 345/661 |
| 2016/0112667 | A1 | 4/2016 | Park et al. | |
| 2016/0139633 | A1* | 5/2016 | Lee | G06F 1/1652 |
| | | | | 345/33 |

* cited by examiner

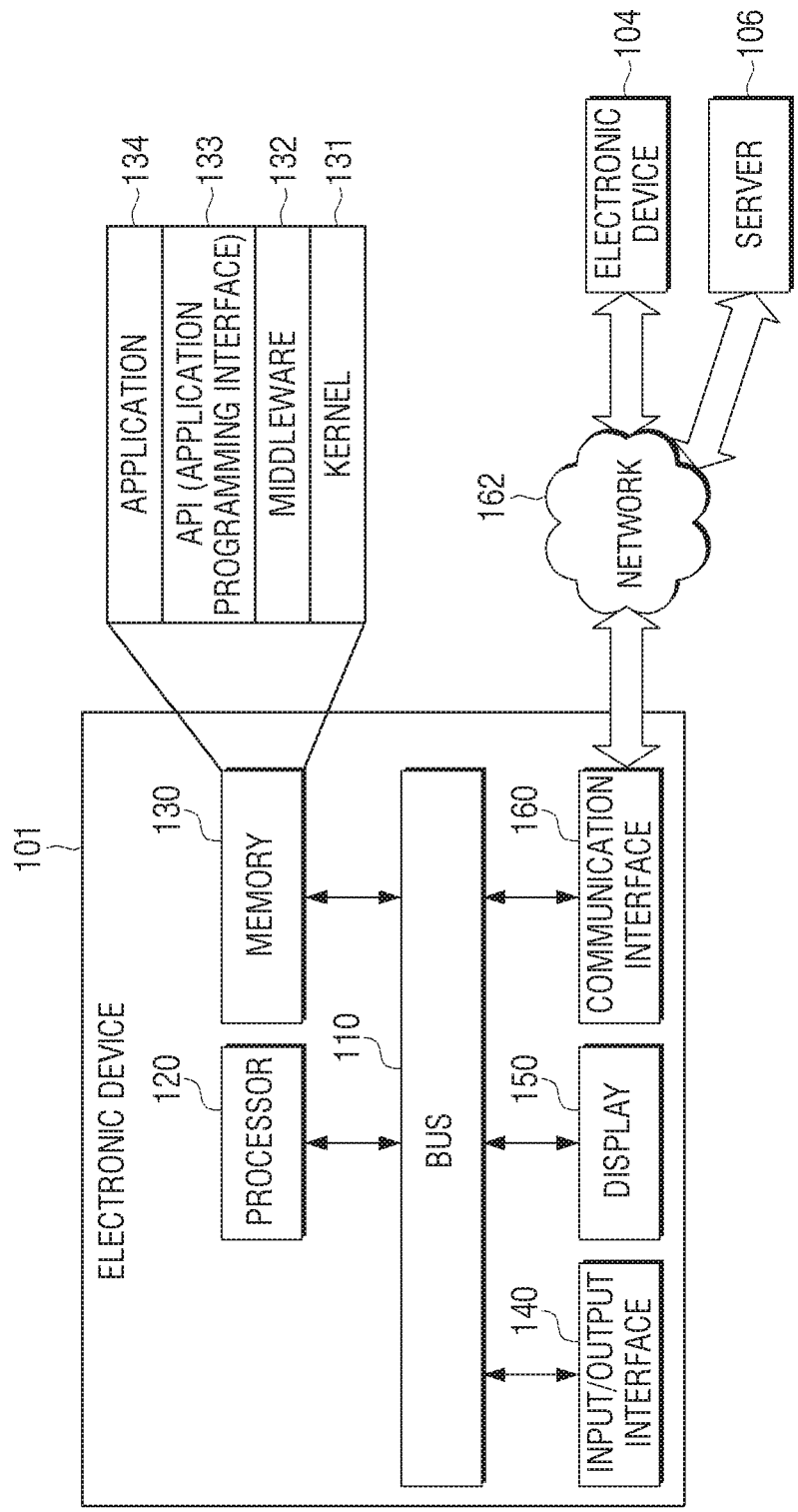

FIG. 4A
FIG. 4B
FIG. 4C
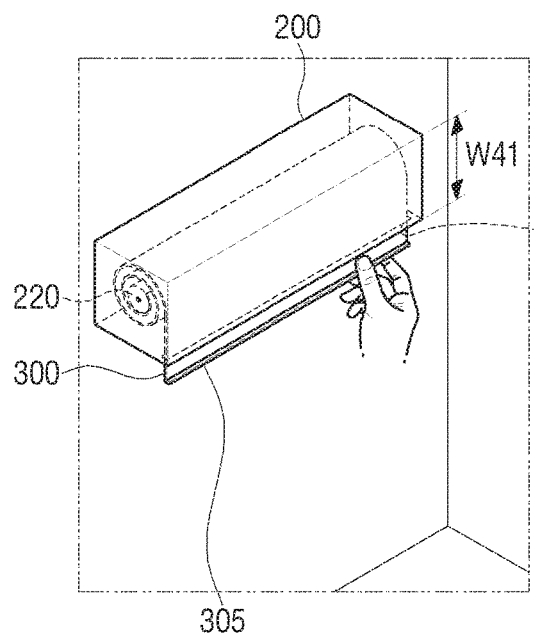
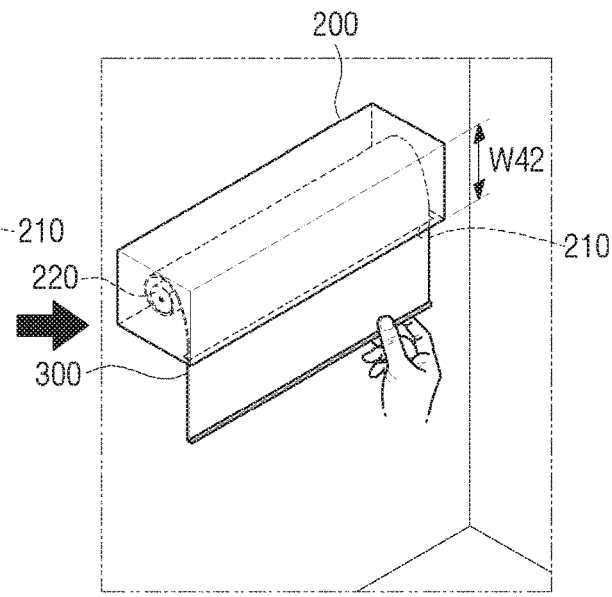
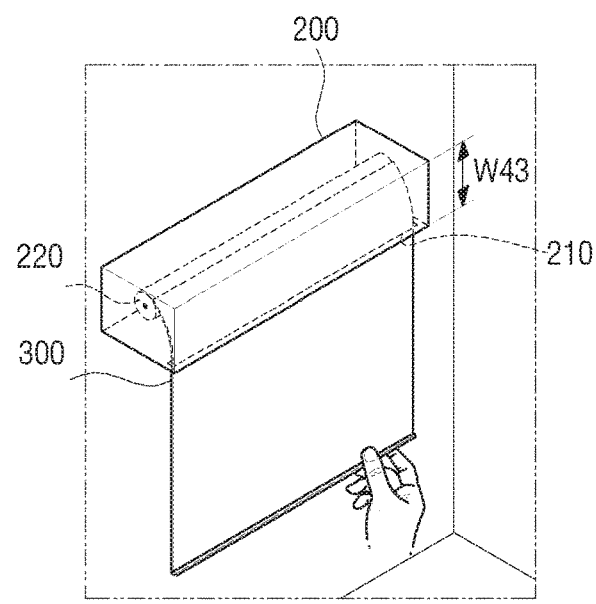

FIG. 5A
FIG. 5B
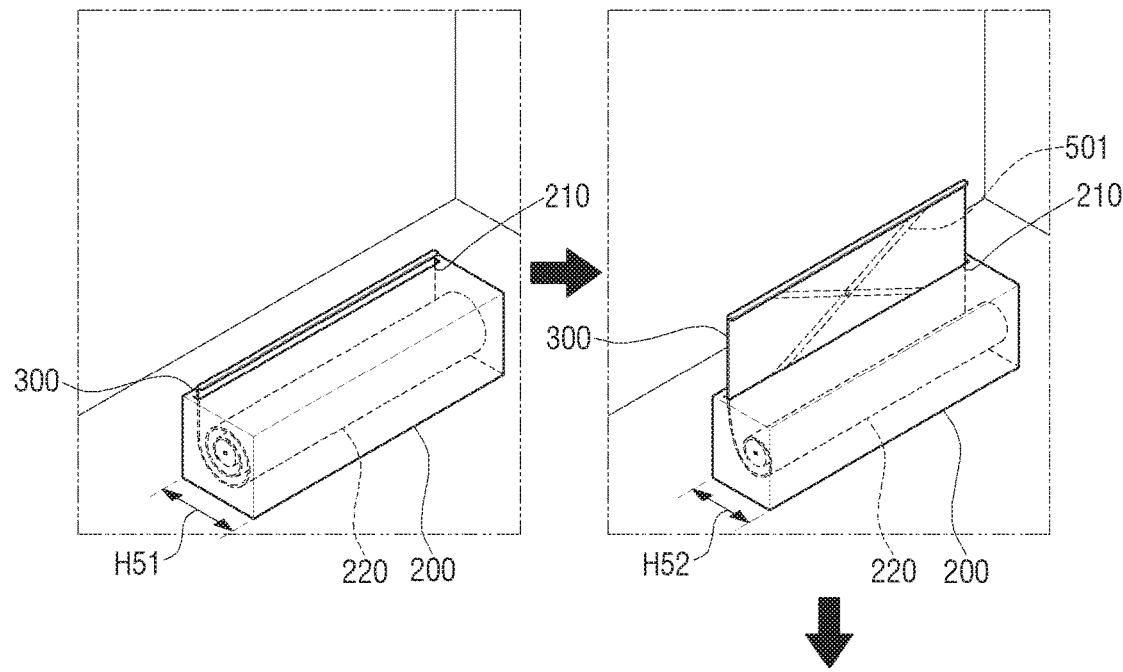
FIG. 5C
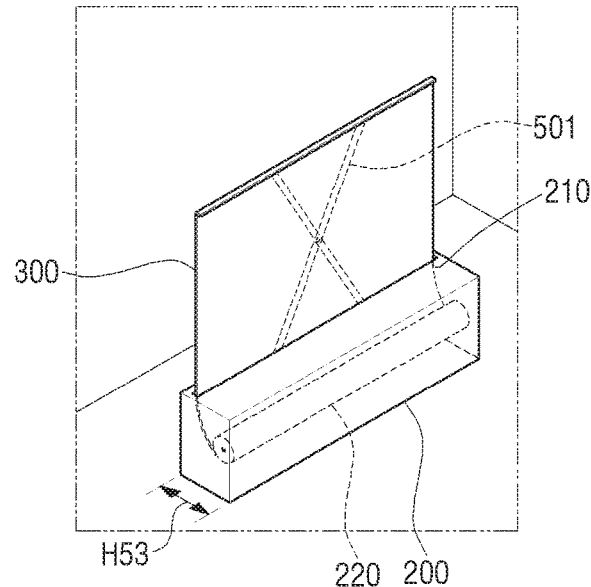

FIG. 5D
FIG. 5E
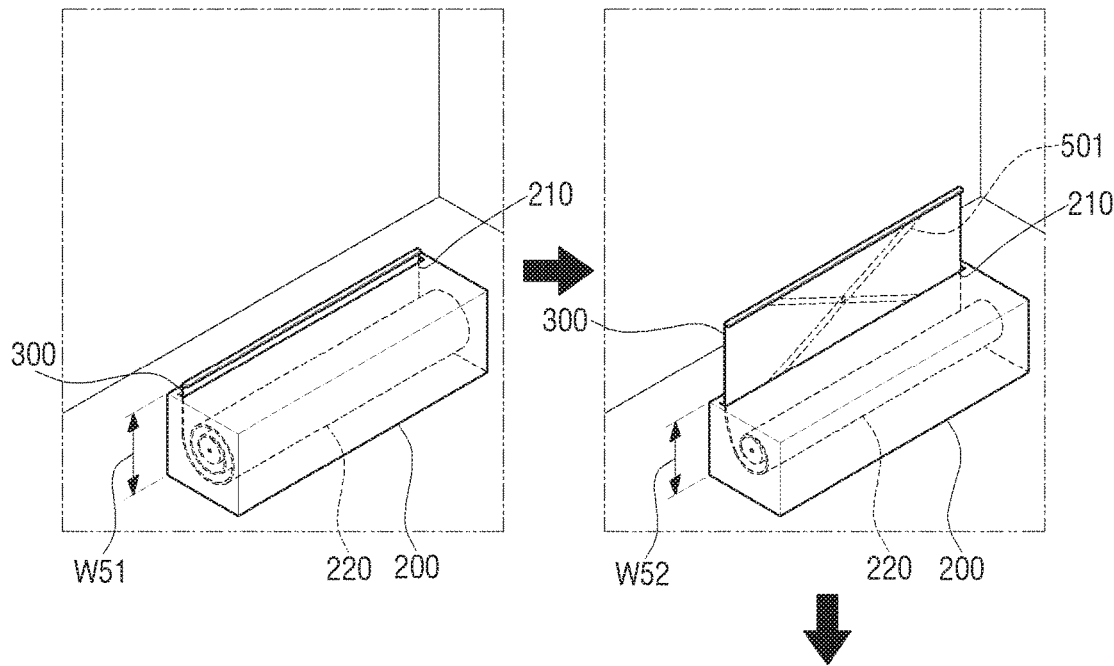
FIG. 5F
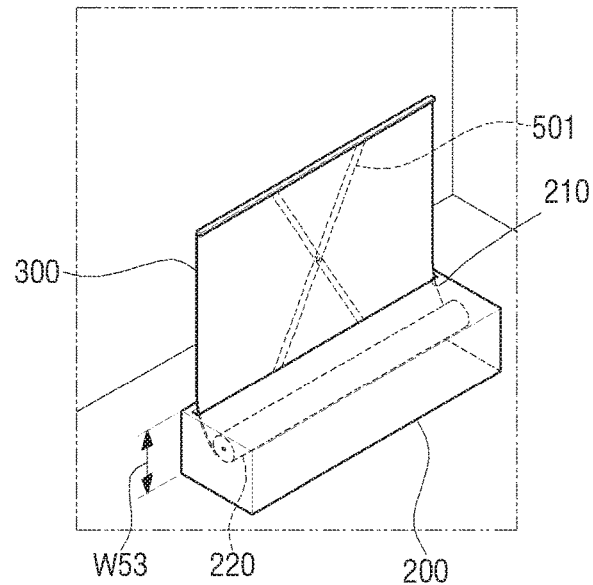

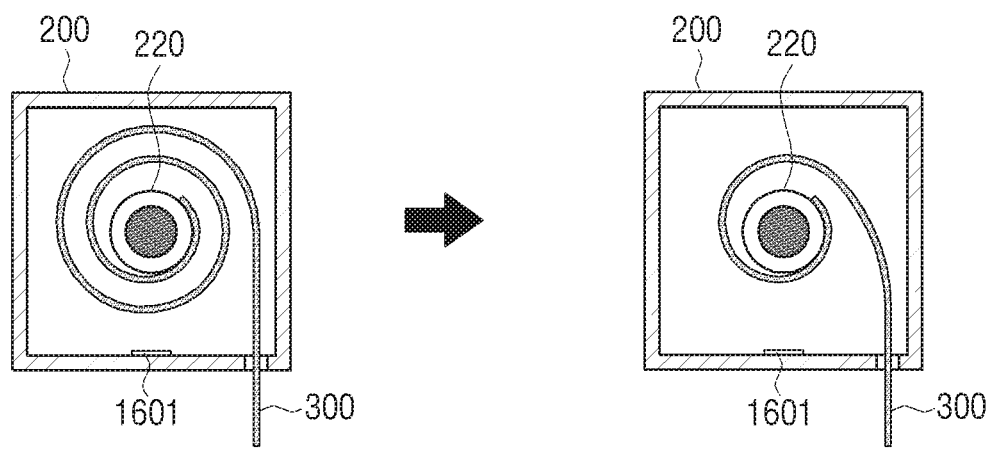

(e)

ELECTRONIC DEVICE HAVING FLEXIBLE DISPLAY

CROSS-REFERENCE TO RELATED APPLICATION(S)

This application claims the benefit under 35 U.S.C. § 119(a) of a Korean patent application filed on Jul. 20, 2015 in the Korean Intellectual Property Office and assigned Serial number 10-2015-0102517, the entire disclosure of which is hereby incorporated by reference.

TECHNICAL FIELD

The present disclosure relates to an electronic device. More particularly, the present disclosure relates to an electronic device having a structure containing a flexible display therein, wherein a size of the structure is varied as the flexible display is withdrawn from the electronic device.

BACKGROUND

Recently, a display has been situated as an important device among electronic products. Although electronic devices having such displays have been gradually miniaturized, many consumers have demanded a large screen of the display even as the device is becoming miniaturized. Accordingly, research and development has been actively directed toward making a flexible display which can be wound in the electronic device or which has a foldable screen.

When a user withdraws such a flexible display from an opening of an electronic device to view content, he/she may be obstructed while viewing the content on the flexible display by a housing or other components of the electronic device.

For example, due to the step height between the flexible display and the housing, a part of an image display region of the flexible display may be hidden. In particular, in the case where a user views the content of the flexible display from the side of the electronic device, the image display region of the flexible display, which is adjacent to the housing, may be partially hidden in accordance with a user's viewing angle.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages and to provide at least the advantages described below. Accordingly, an aspect of the present disclosure is to provide an electronic device having a flexible display, in which the size of a housing containing the flexible display is reduced in association with the withdrawal of the flexible display from the housing.

In accordance with an aspect of the present disclosure, an electronic device is provided. The electronic device includes a housing having an opening, a roll installed in the housing, a flexible display configured to be wound on the roll and to be able to be withdrawn through the opening in accordance with a rotating direction of the roll, and a housing guide configured to guide a part of the housing so that a height, width and/or overall size of the housing is reduced when the flexible display is withdrawn from the housing through the opening and extended outside of the housing.

In accordance with another aspect of the present disclosure, an electronic device is provided such that, when the flexible display is withdrawn through the opening and extended outside of the housing, the roll may move for a distance, which may be predetermined, on the basis of a size of an empty space in the housing, which is created as the flexible display is withdrawn.

In accordance with another aspect of the present disclosure, an electronic device is provided such that, the housing guide may guide the part of the housing in a direction toward the roll so that the height, width and/or overall size of the housing is reduced.

In accordance with another aspect of the present disclosure, an electronic device is provided such that, the housing guide may guide the part of the housing on the basis of a withdrawal rate of the flexible display.

In accordance with another aspect of the present disclosure, an electronic device is provided such that, the housing guide may guide the part of the housing on the basis of a size of an empty space in the housing, which is created as the flexible display is withdrawn.

In accordance with another aspect of the present disclosure, an electronic device is provided such that, the housing may have a multilayer structure that includes an upper portion and a lower portion, and the housing guide may guide the portions of the housing so that the height, width and/or overall size of the housing is reduced as the upper portion and the lower portion of the housing overlap each other as the flexible display is withdrawn.

In accordance with another aspect of the present disclosure, an electronic device is provided such that, the housing guide may guide the part of the housing so that a height and/or a width of the housing is reduced as the flexible display is withdrawn.

In accordance with another aspect of the present disclosure, an electronic device is provided wherein the housing guide may include a center shaft gear connected to a center shaft of the roll, and a rail fixed to the part of the housing to move so that the height, width and/or overall size of the housing is reduced in accordance with power that is transferred from the center shaft gear as the flexible display is withdrawn.

In accordance with another aspect of the present disclosure, an electronic device is provided wherein the housing guide may include a pressure bar or piston, and a joint lever connected to the pressure bar and having a height that is adjusted so that the height, width and/or overall size of the housing is reduced in accordance with a change in length of the pressure bar as the flexible display is withdrawn.

In accordance with another aspect of the present disclosure, an electronic device is provided wherein the housing guide may include a center shaft gear connected to a center shaft of the roll, and a center shaft rail engaged with the center shaft gear to guide a movement path of the roll when the flexible display is withdrawn through the opening and extended outside of the housing.

In accordance with another aspect of the present disclosure, an electronic device is provided. The electronic device includes a housing having an opening, a roll installed in the housing, a flexible display configured to be wound on and to be unwound from the roll, and a housing guide configured to vary a height, width and/or overall size of the housing in accordance with an operation of the flexible display that is withdrawn from the housing through the opening.

In accordance with another aspect of the present disclosure, an electronic device is provided wherein the housing may include at least a first portion and a second portion that are separated from each other, and the first portion and the second portion are mutually connected by the housing guide.

In accordance with another aspect of the present disclosure, an electronic device is provided wherein the housing guide may operate through reception of forward and backward rotating forces of the roll through a power transfer member.

In accordance with another aspect of the present disclosure, an electronic device is provided wherein a variable rate of the height, width and/or overall size of the housing may be determined on the basis of a withdrawal rate or a rotation rate of the flexible display that is sensed by a sensor.

In accordance with another aspect of the present disclosure, an electronic device is provided wherein a variable rate of the height, width and/or overall size of the housing may be determined on the basis of a withdrawal rate of the flexible display that is calculated through a distance rate between one side of the housing and the flexible display, which is sensed by a sensor.

In accordance with another aspect of the present disclosure, an electronic device is provided wherein the housing may include first to third portions that are successively arranged, and the first to third portions may reduce the height, width and/or overall size of the housing through movement toward the roll as the flexible display is withdrawn from the housing.

In accordance with another aspect of the present disclosure, an electronic device display housing is provided. The display housing includes a stationary housing portion, a movable housing portion, slidably engaged with the stationary housing portion, a roll, rotatably installed in at least one of the stationary housing portion and the movable housing portion, and a housing guide configured to guide the movable housing portion into the stationary housing portion in response to rotation of the roll.

In accordance with another aspect of the present disclosure, an electronic device display housing is provided further comprising a flexible display disposed on the roll, wherein the roll is configured to rotate as the flexible display disposed thereon is withdrawn from the display housing.

In accordance with another aspect of the present disclosure, an electronic device display housing is provided wherein the roll is further configured to move toward at least one of the stationary housing portion and the movable housing portion in response to rotation of the roll.

In accordance with another aspect of the present disclosure, a method for providing a flexible display from a display housing is provided. The method for providing a flexible display includes operations for disposing a flexible display on a roll, rotatably installed in at least one of a stationary housing portion and a movable housing portion, withdrawing the flexible display, wherein the roll is configured to rotate as the flexible display disposed thereon is withdrawn, and controlling a housing guide configured to guide the movable housing portion into the stationary housing portion in response to rotation of the roll.

In accordance with another aspect of the present disclosure, a method for providing a flexible display is provided wherein the roll is further configured to move toward at least one of the stationary housing portion and the movable housing portion in response to rotation of the roll.

According to the various embodiments of the present disclosure, since the height, width and/or overall size of the housing of the electronic device is reduced when the user withdraws the flexible display from the opening of the electronic device, obstructions to the flexible display region by the housing can be prevented thereby minimizing inconvenience to the user. Through this, a user's viewing of the content can be maintained or improved, and satisfaction of the user who prefers devices having slim designs can be heightened.

Other aspects, advantages, and salient features of the disclosure will become apparent to those skilled in the art from the following detailed description, which, when taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a block diagram illustrating a network environment including an electronic device according to an embodiment of the present disclosure;

FIGS. 4A to 4C are perspective views illustrating examples of the housing of the electronic device of FIGS. 2A to 2C according to various embodiments of the present disclosure;

FIGS. 5A to 5F are perspective views illustrating examples of the housing of the electronic device of FIGS. 2A to 2C according to various embodiments of the present disclosure;

FIGS. 16A and 16B are views illustrating examples of sensing withdrawal and retraction of a flexible display in an electronic device according to various embodiments of the present disclosure;

Throughout the drawings, like reference numerals will be understood to refer to like parts, components, and structures.

DETAILED DESCRIPTION

Figure 2A:
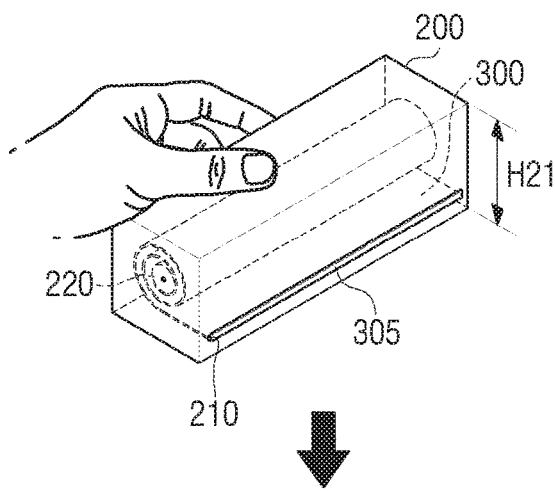
FIGS. 2A to 2C are perspective views illustrating a housing of an electronic device in which a size of the housing is gradually reduced in accordance with a degree to which a flexible display is withdrawn from the housing according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

In the description, the term "has", "may have", "includes", or "may include", indicates existence of a corresponding feature (e.g., a numerical value, a function, an operation, or a constituent element such as a component), but does not exclude existence of an additional feature.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope of the present disclosure, the first element may be called the second element, and the second element may be called the first element in a similar manner.

If it is described that a certain element (e.g., first element) is "operatively or communicatively coupled with/to" or is "connected to" another element (e.g., second element), it should be understood that the certain element may be connected to the other element directly or through still another element (e.g., third element). In contrast, if it is described that a certain element (e.g., first element) is "directly coupled to" or "directly connected to" another element (e.g., second element), it may be understood that still another element (e.g., third element) does not exist between the certain element and the other element.

In the description, the term "configured to" may be changed to, for example, "suitable for", "having the capacity to", "designed to", "adapted to", "made to", or "capable of" under certain circumstances. The wording "configured to" may not necessarily mean "specifically designed to" in hardware. Instead, under certain circumstances, the term "device configured to" may mean "device capable of" doing something together with another device or components. For example, the phrase "processor configured to perform A, B, and C" may mean a dedicated processor (e.g., embedded processor) for performing the corresponding operations or a generic-purpose processor (e.g., central processing unit (CPU) or application processor (AP)) that can perform the corresponding operations through execution of one or more software programs stored in a memory device.

All terms (including technical and scientific terms) used in the description could be used as meanings commonly understood by those ordinary skilled in the art to which the present disclosure belongs. The terms that are used in the present disclosure and are defined in a general dictionary may be used as meanings that are identical or similar to the meanings of the terms from the context of the related art, and they are not interpreted ideally or excessively unless they have been clearly and specially defined. According to circumstances, even the wordings that are defined in the present disclosure are not interpreted to exclude the various embodiments of the present disclosure.

An electronic device according to various embodiments of the present disclosure may include, for example, at least one of a smart phone, a tablet personal computer (PC), a mobile phone, a video phone, an e-book reader, a desktop PC, a laptop PC, a net book computer, a workstation, a server, a personal digital assistant (PDA), a portable multimedia player (PMP), a Moving Picture Experts Group phase 1 or phase 2 (MPEG-1 or MPEG-2) audio layer 3 (MP3)

player, a mobile medical device, a camera, and a wearable device. In various embodiments of the present disclosure, the wearable device may include at least one of an accessory type (e.g., a watch, a bracelet, an anklet, a necklace, glasses, or a head-mounted device (HMD), a fabric or cloth-embedded type (e.g., electronic clothes), a body-attached type (e.g., a skin pad or a tattoo), and an implantable type (e.g., an implantable circuit).

In various embodiments of the present disclosure, the electronic device may be a home appliance. The home appliance may include, for example, at least one of a television (TV) receiver, a digital versatile disc (DVD) player, an audio device, a refrigerator, an air conditioner, a cleaner, a washing machine, an air conditioner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and a digital photo frame.

In an embodiment of the present disclosure, the electronic device may include, for example, at least one of various kinds of medical devices (e.g., various kinds of portable medical measurement devices (a blood glucose measurement device, a heart rate monitor, a blood pressure monitor, and a body temperature measurement device), a magnetic resonance angiography (MRA), a MR imaging (MRI), a computed tomography (CT), a photography device, and an ultrasonic device), a navigation device, a global navigation satellite system (GNSS), an event data recorder (EDR), a flight data recorder (FDR), a vehicle infotainment device, ship electronic equipment (e.g., a ship navigation device or a gyro compass), avionics, a security device, a vehicle head unit, industrial or home robot, an automatic teller's machine (ATM) for financial institutions, point of sales (POS) for stores, and Internet of things (e.g., a lamp, various kinds of sensors, an electric or gas meter, a spring cooler, a fire alarm, a thermostat, a street lamp, a toaster, athletic training equipment, a warm water tank, a heater, and a boiler).

In an embodiment of the present disclosure, the electronic device may include at least one of a part of furniture or a building/structure, an electronic board, an electronic signature receiving device, a projector, and various kinds of measurement devices (e.g., water pipe, electricity, gas, and radio wave measurement devices). In various embodiments of the present disclosure, the electronic device may be a combination of one or more of the above-described devices. In an embodiment of the present disclosure, the electronic device may be a flexible electronic device. Further, the electronic device according to the various embodiments of the present disclosure is not limited to the above-described devices, but may include new electronic devices in accordance with the technical development.

FIG. 1 is a block diagram illustrating a network environment including an electronic device according to an embodiment of the present disclosure.

Referring to FIG. 1, an electronic device 101 may include a bus 110, a processor 120, a memory 130, an input and output interface 140, a display 150, and a communication interface 160 but embodiments are not limited thereto.

The bus 110 may be a circuit which connects the above-described constituent elements to one another and transfers communications (e.g., control messages) between the above-described constituent elements.

The processor 120 may receive a command from other constituent elements (e.g., the memory 130, the input and output interface 140, the display 150, and the communication interface 160) through the bus 110, decode the received command, and perform an operation or data processing in accordance with the decoded command.

The memory 130 may store the command or data that is received from or that is generated by the processor 120 or the other constituent elements (e.g., the input and output interface 140, the display 150, and the communication interface 160). The memory 130 may include, for example, programming modules of a kernel 131, middleware 132, an application programming interface (API) 133, and/or an application 134 but embodiments are not limited thereto. The programming modules may be composed of software, firmware, hardware, or a combination thereof.

The kernel 131 may control or manage the remaining program modules, for example, system resources (e.g., the bus 110, the processor 120, or the memory 130) that are used to execute an operation or a function that is implemented by the middleware 132, the API 133, or the application 134. Further, the kernel 131 may provide an interface through which the middleware 132, the API 133, or the application 134 can access and control or manage the individual constituent elements of the electronic device 101.

The middleware 132 may serve as a relay so that the API 133 or the application communicates with the kernel 131 to exchange data with each other. Further, the middleware 132 may perform a control (e.g., scheduling or balancing) in relation to task requests that are received from the application 134, for example, using a method of assigning a priority for using the system resource (e.g., the bus 110, the processor 120, or the memory 130) of the electronic device 101 to the at least one application 134.

The API 133 is an interface through which the application 134 controls the function that is provided from the kernel 131 or the middleware 132, and may include, for example, at least one interface or function (e.g., command) for file control, window control, image processing, or text control.

In various embodiments of the present disclosure, the application 134 may include a short message service (SMS)/multimedia message service (MMS) application, an e-mail application, a calendar application, an alarm application, a health care application (e.g., application for measuring the amount of exercise or blood glucose), and an environmental information application (e.g., application for providing atmospheric pressure, humidity, and temperature information). Additionally or alternatively, the application 134 may be an application that is related to information exchange between the electronic device 101 and an external electronic device (e.g., electronic device 104 or server 106). The application related to the information exchange may include, for example, a notification relay application for relaying specific information to the external electronic device and a device management application for managing the external electronic device.

For example, the notification relay application may include a function of relaying notification information that is generated from other applications (e.g., the SMS/MMS application, the e-mail application, the health care application, and the environmental information application) of the electronic device 101 to the external electronic device (e.g., electronic device 104). Additionally or alternatively, the notification relay application may receive, for example, notification information from the external electronic device (e.g., electronic device 104) and provide the received notification information to a user. The device management application may manage (e.g., install, delete, or update) a function (e.g., turn-on/turn-off of the external electronic device (e.g., electronic device 104) itself or partial constituent elements thereof or brightness (or resolution) adjustment of the display) with respect to at least a part of the external electronic device that communicates with the electronic device 101, an application that operates in the external electronic device, or a service (e.g., call service or message service) that is provided from the external electronic device.

In various embodiments of the present disclosure, the application 134 may include an application designated in accordance with an attribute (e.g., kind of the electronic device) of the external electronic device (e.g., electronic device 104). For example, in the case where the external electronic device is an MP3 player, the application 134 may include an application related to music reproduction. Similarly, in the case where the external electronic device is a mobile medical device, the application 134 may include an application related to health care. In an embodiment of the present disclosure, the application 134 may include at least one of an application designated in the electronic device 101 and an application received from the external electronic device (e.g., electronic device 104 or server 106).

The input and output interface 140 may transfer, for example, a command or data that is input from a user through an input and output device (e.g., sensor, keyboard, or touch screen) to the processor 120, the memory 130, or the communication interface 160 through the bus 110. For example, the input and output interface 140 may provide data for a user's touch that is input through a touch screen to the processor 120. Further, the input and output interface 140 may output, for example, a command or data, which is received from the processor 120, the memory 130, or the communication interface 160 through the bus 110, through the input and output device (e.g., speaker or display). For example, the input and output interface 140 may output audio data that is processed through the processor 120 to a user through the speaker.

The display 150 may display various kinds of information (e.g., multimedia data or text data) to the user. The display 150 may include, for example, a liquid crystal display (LCD), a light-emitting diode (LED) display, an organic LED (OLED) display, a micro electro mechanical system (MEMS) display, an electronic paper display, or a flexible display having a display portion that is bent or flexed, or is capable of being bent or flexed, but embodiments are not limited thereto. The display 150 may display, for example, various kinds of content (e.g., text, image, video, icon, or symbol) to the user. The display 150 may include a touch screen, and may receive, for example, a touch, gesture, proximity, or hovering input using an electronic pen or a part of a user's body. As described in greater detail below, the display 150 may be formed as a housing containing a roll therein on which a flexible display is rolled.

The electronic device 101 may further include the communication interface 160. The communication interface 160 may connect communication between the electronic device 101 and the external device (e.g., electronic device 104 or server 106). For example, the communication interface 160 may be connected to the network 162 through wireless or wired communication to communicate with the external device. The wireless communication may include, for example, at least one of Wi-Fi, Bluetooth (BT), near field communication (NFC), global positioning system (GPS), and cellular communication (e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communication (GSM)). The wired communication may include, for example, at least one of universal serial bus (USB), high definition multimedia interface (HDMI), recommended standard 232 (RS 232), and plain old telephone service (POTS).

In an embodiment of the present disclosure, the network 162 may be a telecommunication network. The communication network may include at least one of a computer network, Internet, Internet of things, and a telephone network. In an embodiment of the present disclosure, a protocol (e.g., transport layer protocol, data link layer protocol, or physical layer protocol) for communication between the electronic device 101 and the external devices may be supported by at least one of the application 134, the API 133, the middleware 132, the kernel 131, and the communication interface 160.

Figure 2B:
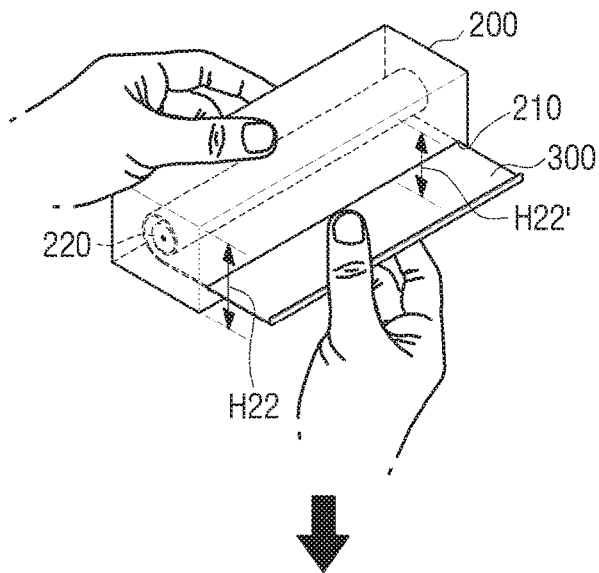
Figure 2C:
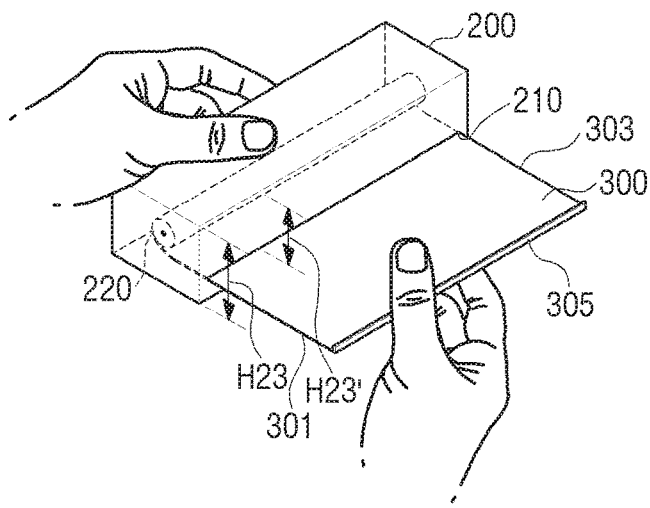

FIGS. 2A to 2C are perspective views illustrating a housing of an electronic device in which a size of the housing is gradually reduced in accordance with a degree to which a flexible display is withdrawn from the housing according to various embodiments of the present disclosure.

Referring to FIGS. 2A to 2C, the electronic device 101 of FIG. 1 may include a housing 200, and a roll 220 on which a flexible display 300 is rolled. The flexible display 300 is wound on the roll 220 to be positioned inside the housing 200 and may be unwound from the roll 220 to be withdrawn from the housing 200. In a reverse operation, the withdrawn flexible display 300 may be returned into the housing 200 by an opposite rotation of the roll 220. As described in greater detail below, withdrawal of the flexible display 300 from the housing 200 results in size reduction to the housing 200. Although not described in detail, the reverse operation where the withdrawn flexible display 300 is retracted or otherwise returned into the housing 200 results in a substantially equal and opposite size enlargement to the housing 200 in a reverse of the operations described below.

The electronic device 101 has a structure in which the flexible display 300 is rolled to be kept inside the housing 200, and if needed, the flexible display 300 is unrolled and withdrawn from the housing 200 so as to provide information to the user.

For this, an opening 210 is provided on one surface or one side of the housing 200. The flexible display 300 may be extended from the electronic device 101 through the opening 210 of the housing 200 while being unwound from the roll 220. Further, the flexible display 300 may be accommodated in the housing 200 through the opening while being rolled back onto the roll 220.

One end of the flexible display 300 may be connected to the roll 220. The flexible display 300 and the roll 220 may be directly connected to each other, or may be connected to each other through a medium (not illustrated) that performs signal transfer between the flexible display 300 and the electronic device 101.

The roll 220 may be rotated inside the housing 200 such that the flexible display 300 is wound on an outer periphery of the roll 220.

Side protection portions (not illustrated) may be provided on side 301 and side 303 of the flexible display 300 in a width direction. The side protection portions can protect the flexible display 300 against an external impact and/or other damaging forces. The side protection portion may be formed to be thicker than the remainder of the flexible display 300.

Referring to FIG. 2A, the housing 200 may have a first height H21 in a state where the flexible display 300 that is wound on the roll 220 is accommodated in the housing 200. In this case, the user can withdraw the flexible display 300 from the housing 200. For example, the user can withdraw the flexible display 300 from the housing 200 by pulling a handle 305 that is positioned at a front end of the flexible display 300 with one hand in a state where the user grasps the housing 200 of the flexible display 300 with another hand or where the housing 200 is otherwise secured relative to the handle 305.

Referring to FIG. 2B, a part of an image display region of the flexible display 300 may be withdrawn through the opening 210 of the housing 200 and the housing 200 is reduced by reversible contraction into space provided by the withdrawn flexible display 300. Through this, the size of the housing 200 may be reduced as the flexible display 300 is withdrawn from the housing 200.

For example, as an upper portion of the housing 200 is guided in a direction toward the roll 220 by a housing guide 400 (see FIG. 8) described in greater detail below, the height of the housing 200 is changed to a second height H22 that is lower than the first height H21. Accordingly, the height and/or overall size of the housing 200 can be reduced. The user may continue to withdraw the flexible display 300 from the housing 200 further reducing the height and/or overall size of the housing 200.

Referring to FIG. 2C, the entire image display region of the flexible display 300 may be withdrawn through the opening 210 of the housing 200. As the flexible display 300 is additionally withdrawn from the housing 200, the size of the housing 200 can be further reduced. For example, if the flexible display 300 is additionally withdrawn through the opening 210 of the housing 200, the upper portion of the housing 200 is continuously guided in the direction toward the roll 220 by the operation of the housing guide as described in greater detail below. Accordingly, the height of the housing is further changed from the second height H22 to a third height H23 that is lower than the second height H22, and thus the height and/or overall size of the housing 200 can be further reduced.

When a user withdraws such a flexible display from an opening of an electronic device to view content, he/she may be obstructed by the housing while viewing the content on the flexible display. However, as the size of the housing 200 is reduced as the flexible display 300 is withdrawn from the housing 200, the visual field of the user who views content on the flexible display 300 can be maintained or improved. For example, due to a step height H22' between the flexible display 300 and the housing as shown in FIG. 2B, one side of the flexible display 300 may be hidden from the visual field of the user. In this case, if the upper portion of the housing is guided in the direction toward the roll 220 by the operation of the housing guide, the viewing field of the user who views the content on the flexible display 300 can be maintained or improved due to the lowered step height H23' between the flexible display 300 and the housing 200 as shown in FIG. 2C.

Figure 3A:
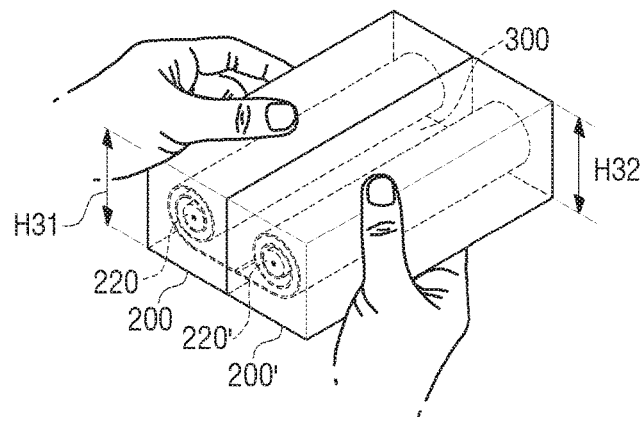
FIGS. 3A to 3C are perspective views illustrating examples of the housing of the electronic device of FIGS. 2A to 2C according to various embodiments of the present disclosure.
Figure 3B:
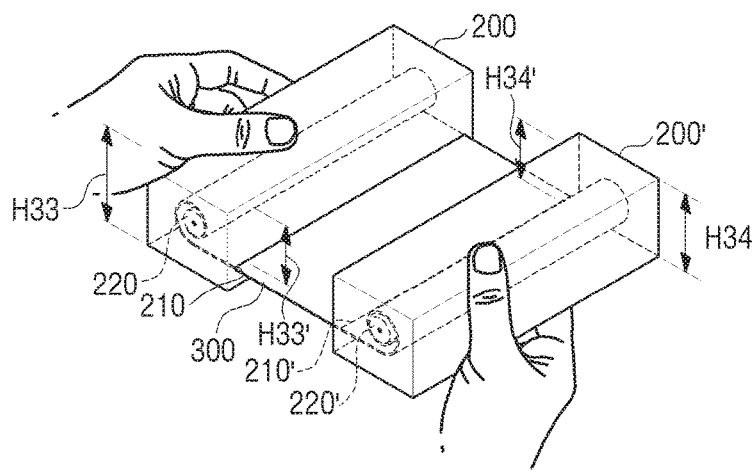
Figure 3C:
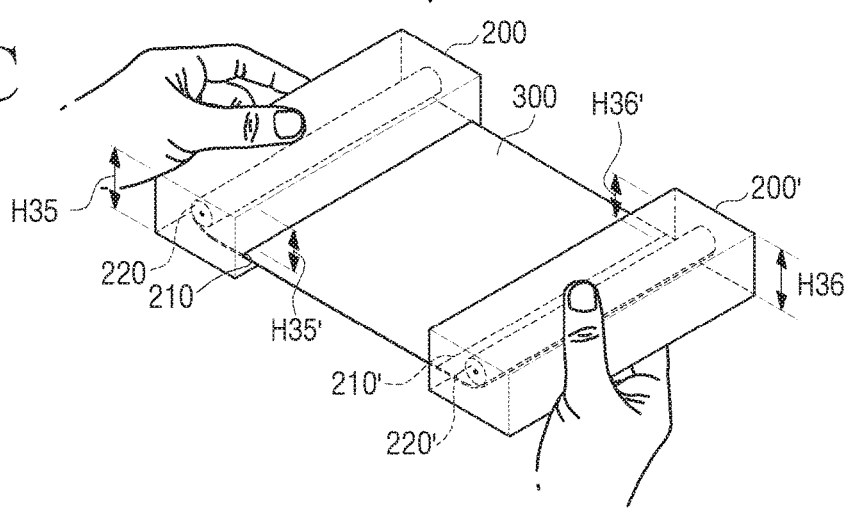

FIGS. 3A to 3C are perspective views illustrating examples of the housing of the electronic device of FIGS. 2A to 2C according to various embodiments of the present disclosure.

Referring to FIG. 3A, an electronic device has a structure in which a part of the flexible display 300 is accommodated in the housing 200 now provided as a first housing, and the remaining part of the flexible display 300 is accommodated in a second housing 200'. The second housing 200' is substantially the same as the housing 200 described above, where the first housing 200 and the second housing share a common flexible display 300. In this state, the height of the first housing 200 and the height of the second housing 200' may be a first height H31 and a first height H32, respectively. In this case, the first height H31 and the first height H32 may be equal to or substantially equal to each other (e.g., a difference between the first height and the second height is within 20%). In this case, the user can withdraw the flexible display 300 from the first housing 200 and/or the second housing 200'. For example, the user can withdraw the flexible display 300 from the first housing 200 and the second housing 200' by grasping and pulling the first housing 200 and the second housing 200', which are positioned on both sides of the flexible display 300, in a direction in which the first housing 200 and the second housing 200' become apart from each other.

Referring to FIG. 3B, a part of an image display region of the flexible display 300 may be withdrawn through an opening 210 of the first housing 200 and/or an opening 210' of the second housing 200'. Through this, the size of the housing 200 may be reduced as the flexible display 300 is withdrawn from the first housing 200. For example, an upper portion of the first housing 200 is guided in a direction toward the first roll 220 by a first housing guide 400 (see FIG. 8). Accordingly, the height of the first housing 200 is changed from the first height H31 to a second height H33 that is lower than the first height H31, and thus the height and/or overall size of the first housing 200 can be reduced.

Further, an upper portion of the second housing 200' is guided in a direction toward a second roll 220' by a second housing guide 400 (see FIG. 8) that has the same structure as the first housing guide as described above. Accordingly, the height of the second housing 200' is changed from the first height H32 to a second height H34 that is lower than the first height H32, and thus the height and/or overall size of the second housing 200' can be reduced. The user may continue to withdraw the flexible display 300 from the first housing 200 and the second housing 200' thereby further reducing the height and/or overall size of one or more of the housings 200 and 200'.

Referring to FIG. 3C, the entire image display region of the flexible display 300 may be additionally withdrawn through the first opening 210 of the first housing 200 and the second opening 210' of the second housing 200'. As the flexible display 300 is additionally withdrawn from the first housing 200 and the second housing 200' as described above, the sizes of the first housing 200 and the second housing 200' can be further reduced. For example, the upper portion of the first housing 200 is continuously guided in the direction toward the first roll 220 by the first housing guide. Accordingly, the height of the first housing 200 is changed from the second height H33 to a third height H35 that is lower than the second height H33, and thus the size of the first housing 200 can be further reduced. Further, the upper portion of the second housing 200' is continuously guided in the direction toward the second roll 220' by the second housing guide. Accordingly, the height of the second housing 200' is changed from the second height H34 to a third height H36 that is lower than the second height H34, and thus the size of the second housing 200' can be further reduced.

As the sizes of the first housing 200 and the second housing 200' are reduced, the visual field of the user who views content through the flexible display 300 can be maintained or improved. For example, due to a step height H33' between the flexible display 300 and the first housing 200 and a step height H34' between the flexible display 300 and the second housing 200' as shown in FIG. 3B, both sides of the flexible display 300 may become hidden from the visual field of the user. In this case, if the upper portion of the first housing 200 is guided in the direction toward the first roll 220 by the operation of the first housing guide, and the upper portion of the second housing 200' is guided in the direction toward the second roll 220' by the operation of the second housing guide, the viewing field of the user who views the content on the flexible display 300 can be maintained or improved due to the lowered step height H35' between the flexible display 300 and the first housing 200 and the lowered step height H36' between the flexible display 300 and the second housing 200' as shown in FIG. 3C.

FIGS. 4A to 4C are perspective views illustrating examples of the housing of the electronic device of FIGS. 2A to 2C according to various embodiments of the present disclosure.

Referring to FIG. 4A, the size of the housing 200 may have a first width W41 in a state where the housing 200 is fixed to a wall. In this case, a user can withdraw the flexible display 300 from the housing 200 as described above. For example, the user can withdraw the flexible display 300 from the housing 200 by pulling the handle 305 that is positioned at the front end of the flexible display 300. Here, the housing 200 may be part of, for example, a rollable TV box or a screen.

Referring to FIG. 4B, a part of an image display region of the flexible display 300 may be withdrawn through the opening 210 of the housing 200 as described above. As the flexible display 300 is withdrawn from the housing 200, the size of the housing 200 may be reduced. For example, as a lower portion of the housing 200 is guided in a direction toward the roll 220 by a housing guide 400 (see FIG. 8), the width of the housing 200 can be reduced to be a second width W42. The user may continue to draw the flexible display 300 out of the housing 200 thereby further reducing the width and/or overall size of the housing 200.

Referring to FIG. 4C, the entire image display region of the flexible display 300 may be additionally withdrawn through the opening 210 of the housing 200. As the flexible display 300 is additionally withdrawn through the opening 210 of the housing 200 as described above, the size of the housing 200 can be further reduced. For example, as a lower portion of the housing 200 is continuously guided in the direction toward the roll 220 by the housing guide, the size of the housing 200 can be reduced to a third width W43.

As the size of the housing 200 is reduced as described above, the user's ability to view the image display region through the flexible display 300 can be maintained or increased.

FIGS. 5A to 5F are perspective views illustrating examples of the housing of the electronic device of FIGS. 2A to 2C according to various embodiments of the present disclosure.

Referring to FIG. 5A, the height of the housing 200 may have a first height H51 in a state where the housing 200 is fixed to a bottom surface. In this case, a user can withdraw the flexible display 300 from the housing 200 as described above. For example, in accordance with a user's operation, the flexible display 300 may be withdrawn from the housing 200 by hand or by a joint lever 501 that is provided on a rear surface of the flexible display 300.

Referring to FIG. 5B, a part of an image display region of the flexible display 300 may be withdrawn through the opening 210 of the housing 200 as described above. At this time, since the height of the housing 200 is changed to a second height H52 that is lower than the first height H51, the size of the housing 200 may be reduced. For example, as a front portion of the housing 200 is guided in a direction toward the roll 220 by a housing guide, the size of the housing 200 can be reduced to the second height H52. In accordance with the received user's input in FIG. 5A, the flexible display 300 may be continuously withdrawn through the opening 210 of the housing 200 thereby further reducing the overall height and/or size of the housing 200.

Referring to FIG. 5C, the entire image display region of the flexible display 300 may be additionally withdrawn through the opening 210 of the housing 200. In this case, the size of the housing 200 can be further reduced to a third height H53 that is lower than the second height H52. For example, as the front portion of the housing 200 is continuously guided in the direction toward the roll 220 by the housing guide, the size of the housing 200 can be further reduced to the third height H53.

Referring to FIG. 5D, the width of the housing 200 may have a first width W51 in a state where the housing 200 is fixed to the bottom. In this case, the user can withdraw the flexible display 300 from the housing 200 as described above. For example, in accordance with the user's operation, the flexible display 300 may be withdrawn from the housing 200 by hand or by the joint lever 501 that is provided on the rear surface of the flexible display 300.

Referring to FIG. 5E, a part of the image display region of the flexible display 300 may be withdrawn through the opening 210 of the housing 200. At this time, since the width of the housing 200 is changed to a second width W52 that is narrower than the first width W51, the size of the housing 200 may be reduced. For example, as the front portion of the housing 200 is guided in the direction toward the roll 220 by the housing guide, the size of the housing 200 can be reduced to the second width W52. In accordance with the received user's input in FIG. 5D, the flexible display 300 may be continuously withdrawn through the opening 210 of the housing 200 thereby further reducing the width and/or overall size of the housing 200.

Referring to FIG. 5F, the entire image display region of the flexible display 300 may be additionally withdrawn through the opening 210 of the housing 200 as described above. In this case, the width of the housing 200 can be further reduced to a third width W53 that is narrower than the second width W52. For example, as the front portion of the housing 200 is continuously guided in the direction toward the roll 220 by the housing guide, the size of the housing 200 can be further reduced to the third width W53.

Figure 6A:
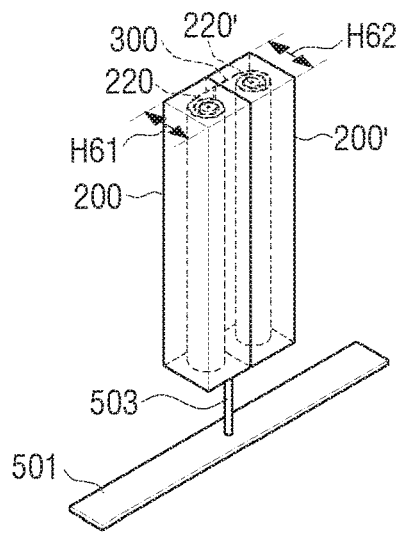
FIGS. 6A to 6C are perspective views illustrating examples of the housing of the electronic device of FIGS. 2A to 2C according to various embodiments of the present disclosure.
Figure 6B:
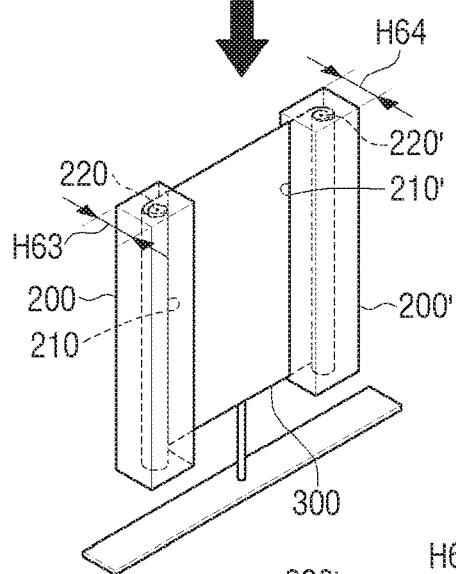
Figure 6C:
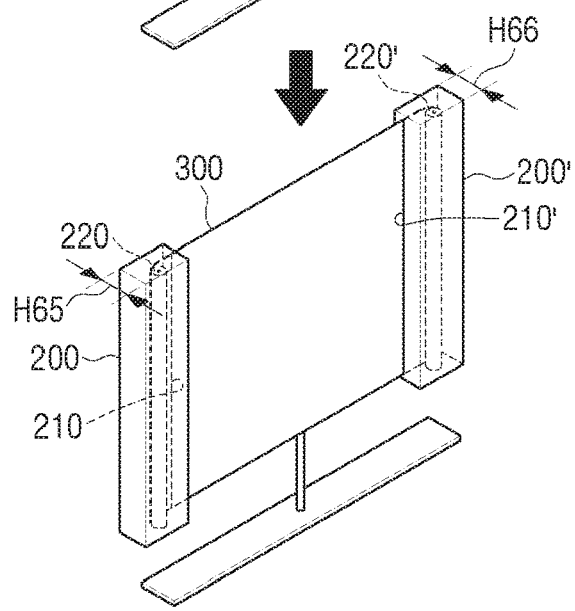

FIGS. 6A to 6C are perspective views illustrating examples of the housing of the electronic device of FIG. 2A to 2C according to various embodiments of the present disclosure.

Referring to FIG. 6A, the first housing 200 and the second housing 200' may be fixed in the air at a predetermined height by a stand 501 that is seated on a bottom surface and a support 503 that is fixed to the stand 501. In this state, the size of the first housing 200 and the size of the second housing 200' may be a first height H61 and a first height H62, respectively. In accordance with a user's input, the flexible display 300 may be automatically withdrawn from the first housing 200 and/or the second housing 200'.

Referring to FIG. 6B, a part of an image display region of the flexible display 300 may be withdrawn through a first opening 210 of the first housing 200, and/or through a second opening 210' of the second housing 200' as described above. The height of the first housing 200 may be reduced to a second height H63 that is lower than the first height H61, and the height of the second housing 200' may be reduced to a second height H64 that is lower than the first height H62. For example, as a front portion of the first housing 200 is guided in a direction toward the first roll 220 by a first housing guide, the height of the first housing 200 may be changed to the second height H63, and thus the size of the first housing 200 may be reduced. Further, as an upper portion of the second housing 200' is guided in a direction toward the second roll 220' by a second housing guide, the height of the second housing 200' may be changed to the second height H64, and thus the size of the second housing 200' may be reduced. In accordance with the received user's input in FIG. 6A, the flexible display 300 may be continuously withdrawn through the first opening 210 of the first housing 200 and the second opening 210' of the second housing 200' thereby further reducing the height and/or overall size of one or more of the housings 200 and 200'.

Referring to FIG. 6C, the entire image display region of the flexible display 300 may be additionally withdrawn through the first opening 210 of the first housing 200 and the second opening 210' of the second housing 200' as described above. Accordingly, the height of the first housing 200 may be further reduced to a third height H65 that is lower than the second height H63, and the height of the second housing 200' may be further reduced to a third height H66 that is lower than the second height H64. For example, as the front portion of the first housing 200 is continuously guided in a direction toward the first roll 220 that is in the first housing by the first housing guide, the height of the first housing 200 is changed to the third height H65, and thus the size of the first housing 200 can be further reduced. Further, as the front portion of the second housing 200' is continuously guided in a direction toward the second roll 220' that is in the second housing by the second housing guide, the height of the second housing 200' is changed to the third height H66, and thus the size of the second housing 200' can be further reduced.

Figure 7A:
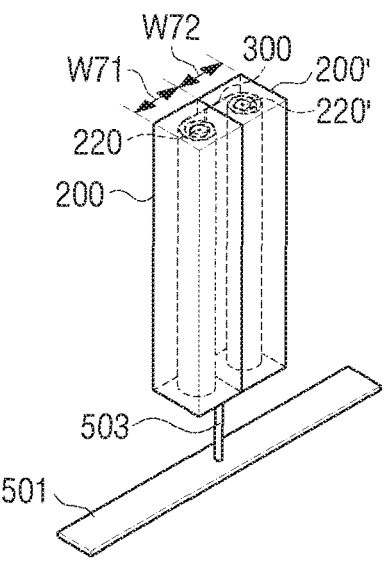
FIGS. 7A to 7C are perspective views illustrating examples of the housing of the electronic device of FIGS. 2A to 2C according to various embodiments of the present disclosure.
Figure 7B:
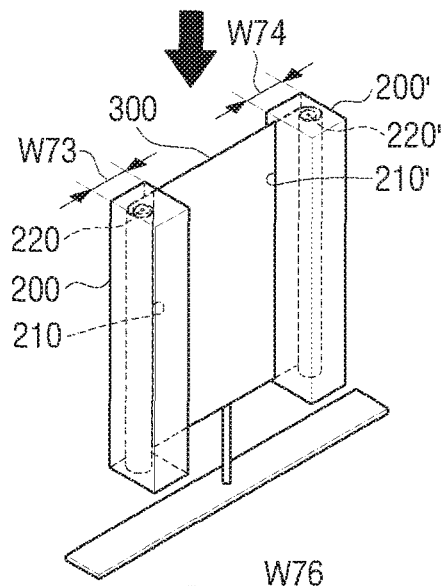
Figure 7C:
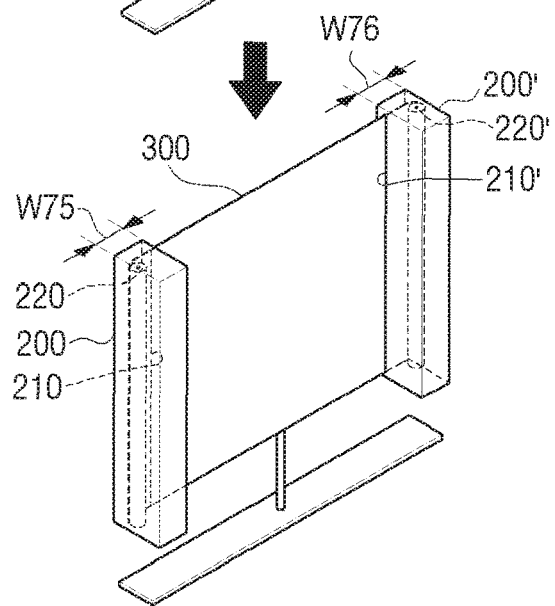

FIGS. 7A to 7C are perspective views illustrating examples of the housing of the electronic device of FIGS. 2A to 2C according to various embodiments of the present disclosure.

Referring to FIG. 7A, the first housing 200 and the second housing 200' may be fixed in the air at a predetermined height by the stand 501 that is seated on the bottom surface and the support 503 that is fixed to the stand 501. In this state, the width of the first housing 200 and the width of the second housing 200' may be a first width W71 and a first width W72, respectively. In this case, in accordance with a user's input, the flexible display 300 may be automatically withdrawn from the first housing 200 and/or the second housing 200' as described above.

Referring to FIG. 7B, a part of the image display region of the flexible display 300 may be withdrawn through the first opening 210 of the first housing 200 and the second opening 210' of the second housing 200'. The width of the first housing 200 may be reduced to a second width W73 that is narrower than the first width W71, and the width of the second housing 200' may be reduced to a second width W74 that is narrower than the first width W72. For example, as a side portion of the first housing 200 is guided in the direction toward the first roll 220 by the first housing guide, the width of the first housing 200 may be changed to the second width W73, and thus the size of the first housing 200 may be reduced. Further, as a side portion of the second housing 200' is guided in the direction toward the second roll 220' by the second housing guide, the width of the second housing 200' may be changed to the second width W74, and thus the size of the second housing 200' may be reduced. In accordance with the received user's input in FIG. 7A, the flexible display 300 may be continuously withdrawn through the first opening 210 of the first housing 200 and the second opening 210' of the second housing 200' thereby further reducing the width and/or overall size of one or more of the housings 200 and 200'.

Referring to FIG. 7C, the entire image display region of the flexible display 300 may be additionally withdrawn through the first opening 210 of the first housing 200 and the second opening 210' of the second housing 200'. The width of the first housing 200 may be further reduced to a third width W75 that is narrower than the second width W73, and the width of the second housing 200' may be further reduced to a third width W76 that is narrower than the second width W74. For example, as the side portion of the first housing 200 is continuously guided in the direction toward the first roll 220 that is in the first housing by the first housing guide, the width of the first housing 200 is changed to the third width W75, and thus the size of the first housing 200 can be further reduced. Further, as the side portion of the second housing 200' is continuously guided in the direction toward the second roll 220' that is in the second housing by the second housing guide, the width of the second housing 200' is changed to the third width W76, and thus the size of the second housing 200' can be further reduced.

Embodiments of the present disclosure can adjust the size of the housings 200 and 200' using housing guides therein in response to the withdrawal of the flexible display 300. The adjustment of the size of the housings through the housing guides will now be described in detail through the following various embodiments of the present disclosure.

Figure 8:
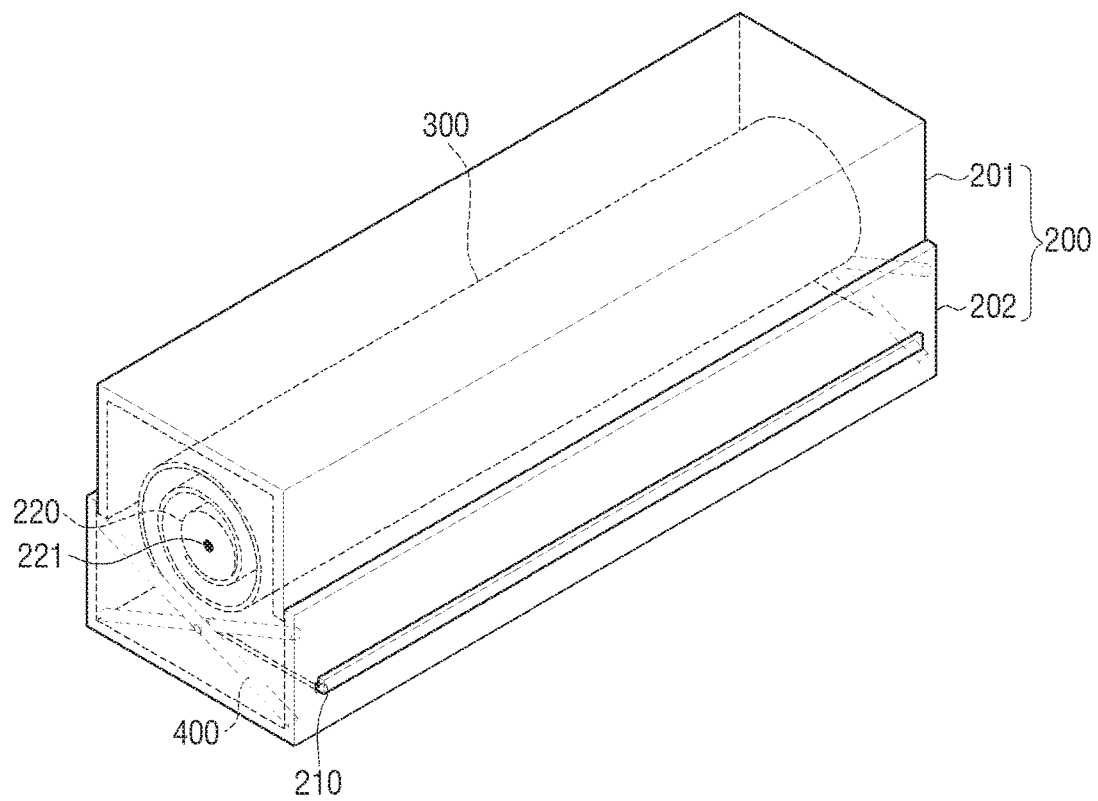
FIG. 8 is a perspective view of a housing of an electronic device including a housing guide according to an embodiment of the present disclosure.

FIG. 8 is a perspective view of a housing of an electronic device including a housing guide according to an embodiment of the present disclosure.

Referring to FIG. 8, the housing 200 may have a multi-layer structure. That is, the housing 200 may include an upper portion 201 and a lower portion 202. The housing guide 400 may be positioned inside the housing 200, and in particular, on one or more sides of the housing to avoid interference with the movement of the flexible display 300. In accordance with an extension or withdrawal rate of the flexible display 300 that is withdrawn through the opening 210 of the housing 200, and a retraction rate of the flexible display 300 that is retracted through the opening 210 of the housing 200 in a reverse operation, the housing guide 400 may guide a part of the housing in a direction toward the roll 220 and center shaft 221 in the housing 200 so that the size of the housing is reduced. For example, the housing guide 400 may guide the upper portion 201 or the lower portion 202 of the housing in the direction toward the roll 220 in the housing 200 so that the upper portion 201 and the lower portion 202 of the housing are moved toward the roll 220 as space becomes available due to withdrawal of the flexible display. As moved toward the roll 220 by the housing guide 400, the upper portion 201, lower portion 202 or other portions as described in detail below, may overlap each other to further reduce the overall size of the housing.

FIGS. 9A to 9D and 10A to 10C are side cross-sectional views illustrating a housing reduced in accordance with guidance of a housing guide according to various embodiments of the present disclosure.

In an embodiment of the present disclosure, the housing guide 400 may guide a part of the housing 200 so that the height, width, and/or overall size of the housing 200 is reduced as the roll 220 moves and/or an outer diameter of the roll is reduced by, for example, removal of flexible display 300 layers on the roll 220. One or more portions of the housing 200 may then be directed by the housing guide 400 to occupy the available space thereby reducing a height, width, and/or overall size of the housing 200.

Figure 9A:
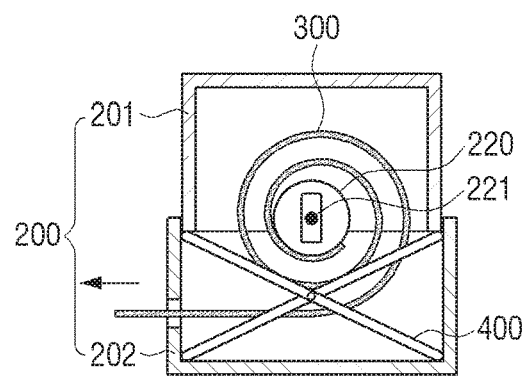
FIGS. 9A to 9D are side cross-sectional views illustrating a housing reduced in size in accordance with guidance of the housing guide illustrated in FIG. 8 according to various embodiments of the present disclosure.

Referring to FIG. 9A, the flexible display 300 may be wound on the roll 220 in a multilayer structure as described above. The roll 220 may be rotated about the center shaft 221 of the roll 220 in the housing 200 as the flexible display 300 is withdrawn from the housing 200, and as the flexible display 300 is retracted into the housing 200.

Figure 9B:
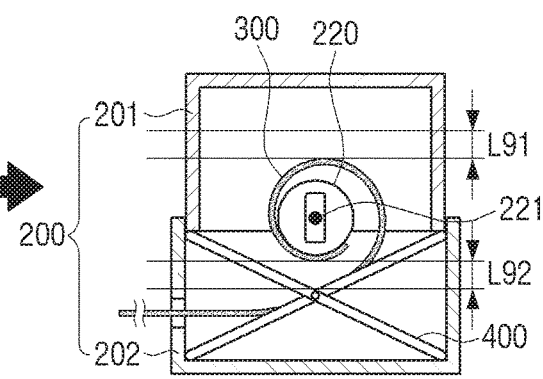

In this case, if a user pulls the flexible display 300, as shown in FIG. 9B, the flexible display 300 is unwound from the roll 220, and a part of the image display region of the flexible display 300 may be withdrawn from the housing 200. At this time, an empty space may be created in the housing to the extent of a withdrawal rate of the flexible display 300. For example, if the flexible display 300 is rotated once to be unwound from the roll 220 as shown in FIG. 9B, an empty space may be created in the housing 200 to the extent of a first distance L91 of an upper portion of the housing 200 and a second distance L92 of a lower portion of the housing 200.

Figure 9D:
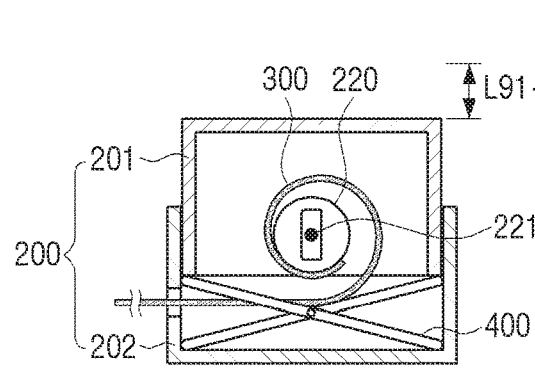
Figure 9C:
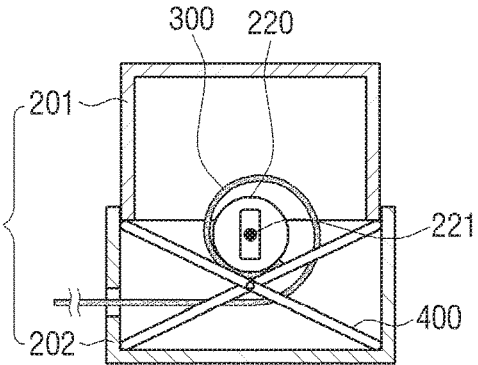

If an empty space is created in the lower portion of the housing 200 to the extent of the second distance L92, as shown in FIG. 9C, the roll 220 itself may move downward to the extent of the second distance L92. At this time, if the withdrawal of the flexible display 300 is sensed, the roll 220 may move in accordance with an operation of a power connection mechanism (not illustrated) such as a gear.

As the roll 220 itself moves downward, an empty space may be created in the upper portion of the housing 200 to the extent of a distance that is the sum of the first distance L91 and the second distance L92. Accordingly, as shown in FIG. 9D, the housing guide 400 may guide the upper portion 201 of the housing 200 in the direction toward the roll 220 to the extent of the distance that is the sum of the first distance L91 and the second distance L92. That is, the housing guide 400 may guide the upper portion 201 of the housing 200 so that the size of the housing 200 is reduced in consideration of the size of the empty space that is created in the housing through the withdrawal of the flexible display 300 and the downward movement of the roll 220.

For convenience in explanation, although FIGS. 9A to 9D exemplify a process of reducing the size of the housing 200 in stages, the processes of FIGS. 9A to 9D may be performed seamlessly or almost seamlessly in accordance with an implementation method such that the size of the housing 200 is seamlessly varied, including both reductions and enlargements, in response to the withdrawal and retraction of the flexible display 300, respectively.

In FIGS. 9A to 9D, if the flexible display 300 is rotated once to be unwound from the roll 220, the variation rate of constituent elements of the electronic device is expressed by the following Equation 1.

$$\text{Increased distance between the housing 200 and the flexible display 300:Movement distance of the center shaft 221:Movement distance of the housing 200}=1{:}1{:}2 \qquad \text{Equation 1}$$

In the case where the housing 200 has a multilayer structure, the number of layers of the housing 200 may be determined on the basis of a relationship between a curvature R of the flexible display 300 that is wound on the roll 220 and a height H of the housing 200. An equation that determines the number of layers of the housing 200 is expressed by the following Equation 2. In this case, the curvature R of the flexible display 300 that is wound on the roll 220 may correspond to a distance measured from the center shaft 221 of the roll 220 to a neutral surface of the wound flexible display 300. When the flexible display 300 is wound, a force that expands outward acts on the outside of the flexible display 300, and a force that shrinks inward acts on the inside of the flexible display 300. In this case, the neutral surface may correspond to a position in which the force that expands outward and the force that shrinks inward offset each other and a vector sum of the forces becomes 0.

$$R<H<2R, N=2 \text{ (}N \text{ is an upper portion/a lower portion)}$$

$$2R<H<3R, N=3 \text{ (}N \text{ is an upper portion/a middle portion/a lower portion)}$$

$$(k-1)*R<H<K*R, N=k \qquad \text{Equation 2}$$

Referring to Equation 2, for example, in the case where the curvature R of the flexible display 300 is 30 mm and the height of the housing 200 is 50 mm, the housing 200 may be composed of two layers that correspond to an upper portion and a lower portion. Further, in the case where the curvature R of the flexible display 300 is 30 mm and the height of the housing 200 is 80 mm, the housing 200 may be composed of three layers that correspond to an upper portion, a middle portion, and a lower portion.

FIGS. 9A to 9D illustrate a housing reduced in accordance with guidance of a housing guide in a state where the roll 220 may move. In an embodiment of the present disclosure, the housing guide 400 may also guide a part of the housing so that the size of the housing 200 is reduced in a state where the roll 220 is fixed.

Figure 10A:
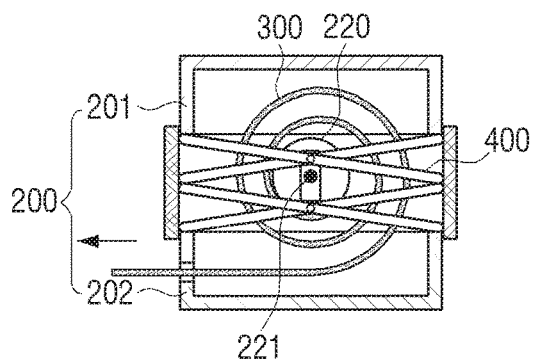
FIGS. 10A to 10C are side cross-sectional views illustrating examples of the housing reduced in size in accordance with guidance of a housing guide according to various embodiments of the present disclosure.

For example, referring to FIG. 10A, the flexible display 300 may be wound on the roll 220 in a multilayer structure, and the roll 220 may be rotated about the center shaft 221 of the roll 220 in the housing 200 as described above.

Figure 10B:
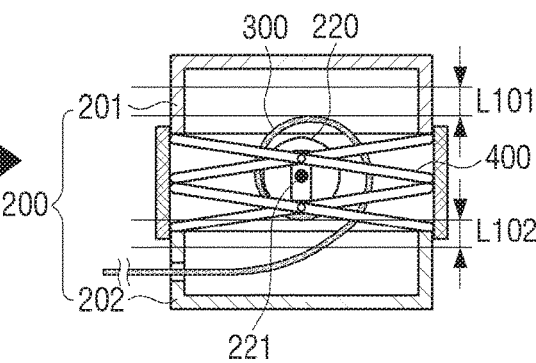

In this case, if the user pulls the flexible display 300, as shown in FIG. 10B, the flexible display 300 is unwound from the roll 220, and a part of the image display region of the flexible display 300 may be withdrawn from the housing 200. At this time, an empty space may be created in the housing 200 to the extent of a withdrawal rate of the flexible display 300. For example, if the flexible display 300 is rotated once to be unwound from the roll 220 as shown in FIG. 10B, an empty space may be created in the housing to the extent of a first distance L101 of an upper portion of the housing 200, and a second distance L102 of a lower portion of the housing 200.

Figure 10C:
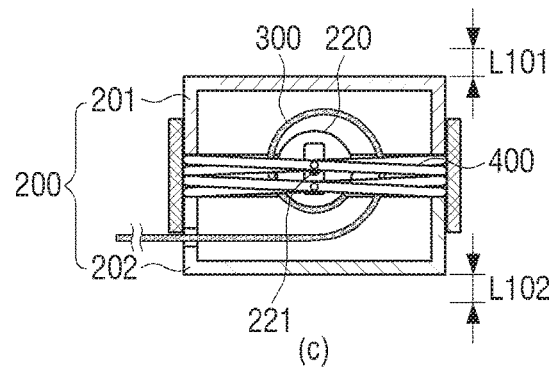

Referring to FIG. 10C, the housing guide 400 may guide the upper portion 201 of the housing 200 in the direction toward the roll 220 to the extent of the first distance L101, and may guide the lower portion 202 of the housing 200 in the direction toward the roll 220 to the extent of the second distance L102. That is, the housing guide 400 may guide the upper portion 201 and the lower portion 202 of the housing 200 so that the height and/or overall size of the housing 200 is reduced in consideration of the size of the empty space that is created in the housing 200 through the withdrawal of the flexible display 300.

For convenience in explanation, although FIGS. 10A to 10C exemplify a process of reducing the size of the housing 200 in stages, the processes of FIGS. 10A to 10C may be performed seamlessly or almost seamlessly in accordance with an implementation method such that the size of the housing 200 is seamlessly varied, including both reductions and enlargements, in response to the withdrawal and retraction of the flexible display 300, respectively.

In FIGS. 10A to 10C, if the flexible display 300 is rotated once to be unwound from the roll 220, the variation rate of constituent elements of the electronic device is expressed by the following Equation 3.

Increased distance between the housing 200 and the flexible display 300:Movement distance of the center shaft 221:Movement distance of the housing 200=1:1:1    Equation 3

In the case where the housing 200 has a multilayer structure, the number of layers of the housing 200 may be determined on the basis of a relationship between the curvature R of the flexible display 300 that is wound on the roll 220 and the height H of the housing 200. An equation that determines the number of layers of the housing 200 is expressed by the following Equation 4.

$R<H<2R, N=3$ ($N$ is an upper portion/a middle portion/a lower portion)

$2R<H<3R, N=5$ ($N$ is an upper portion/an upper middle portion/a middle portion/a lower middle portion/a lower portion)

$(k-1)*R<H<K*R, N=(2*k)-1$    Equation 4

Referring to Equation 4, for example, in the case where the curvature R of the flexible display 300 is 30 mm and the height of the housing 200 is 50 mm, the housing 200 may be composed of three layers that correspond to an upper portion, a middle portion, and a lower portion. Further, in the case where the curvature R of the flexible display 300 is 30 mm and the height of the housing 200 is 80 mm, the housing 200 may be composed of five layers.

FIGS. 11A and 11B, 12A and 12B, and 13A and 13B are side cross-sectional views illustrating examples of a housing reduced in accordance with guidance of a housing guide according to various embodiments of the present disclosure.

In the following description, the constituent elements of the housing guide 400 are positioned on one side of the interior of the housing 200 and illustrate constituent elements that support and/or move the center shaft 221 of the roll 220 and various housing portions in response to the withdrawal of the flexible display 300.

Figure 11A:
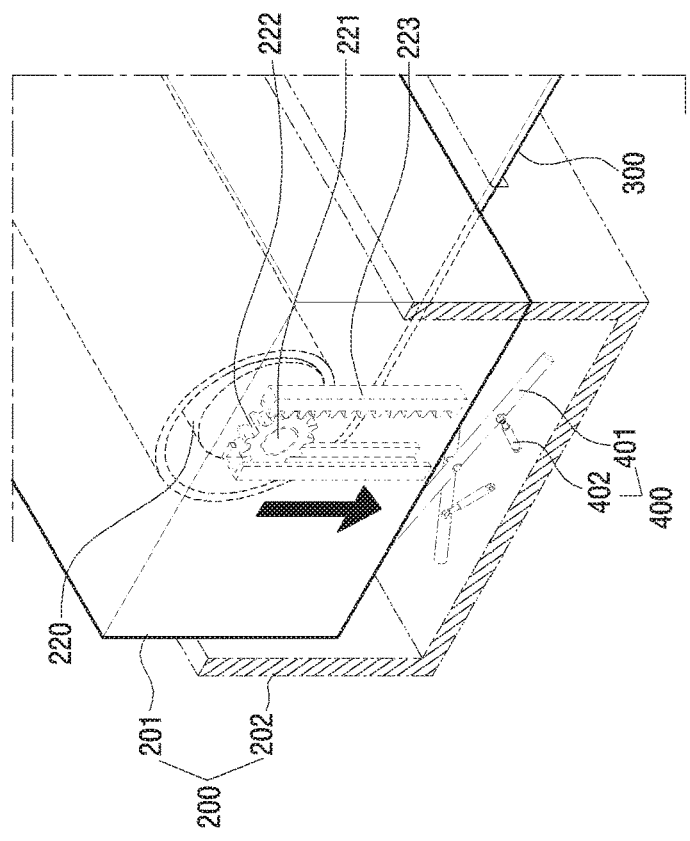
FIGS. 11A and 11B are side cross-sectional views illustrating examples of the housing reduced in size in accordance with guidance of a housing guide according to various embodiments of the present disclosure.

Referring to FIG. 11A, the flexible display 300 may be wound on the roll 220, and the flexible display 300 may be withdrawn from the housing 200 by a user as described above.

As the flexible display 300 is withdrawn from the housing 200, and as the flexible display 300 is retracted into the housing 200, the center shaft 221 of the roll 220 may be rotated.

In this case, as the center shaft 221 is rotated, a center shaft gear 222 that is connected to the center shaft 221 may be rotated. The center shaft gear 222 may be engaged with a center shaft rail 223 that is fixed to the upper portion 201 of the housing 200. The center shaft rail 223 may guide a movement path of the center shaft 221 so that the center shaft 221 itself moves for a distance (e.g., that is equal to or shorter than the height of the upper portion 201 of the housing 200), which may be predetermined, up the center shaft rail 223.

Figure 11B:
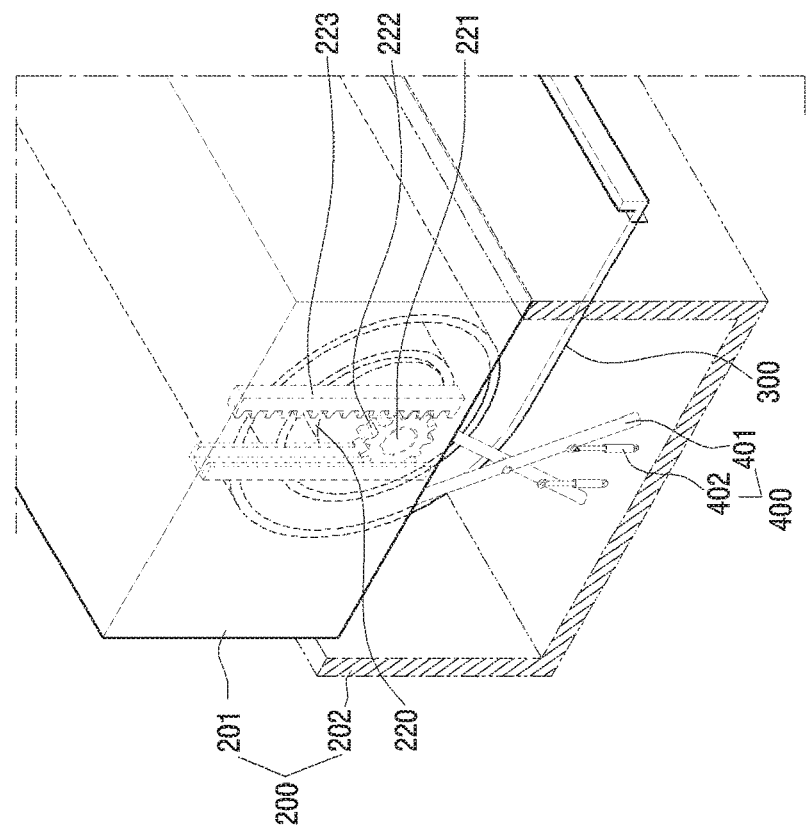

Further, if the withdrawal of the flexible display 300 is sensed, a joint lever 401 and a pressure bar or piston 402 that is fixed to the lower portion 202 of the housing 200, which are constituent elements of the housing guide 400, may guide the upper portion 201 of the housing 200 in a direction toward the center shaft 221. That is, if a withdrawal signal of the flexible display 300 is sensed, a piston that is built in the pressure bar 402 expands or contracts to change the length of the pressure bar 402. If the length of the pressure bar 402 contracts, the height of the joint lever 401 that is connected to the pressure bar 402 is lowered, and the upper portion 201 of the housing 200 that is connected to the joint lever 401 as shown in FIG. 11B may be guided in a direction toward the center shaft 221 so that the size of the housing 200 is reduced.

A method for sensing the withdrawal of the flexible display 300 for directing the control of the joint lever 401 and pressure bar 402 will be described in greater detail below with reference to FIGS. 14, 15A and 15B, and 16A 16B.

Figure 12A:
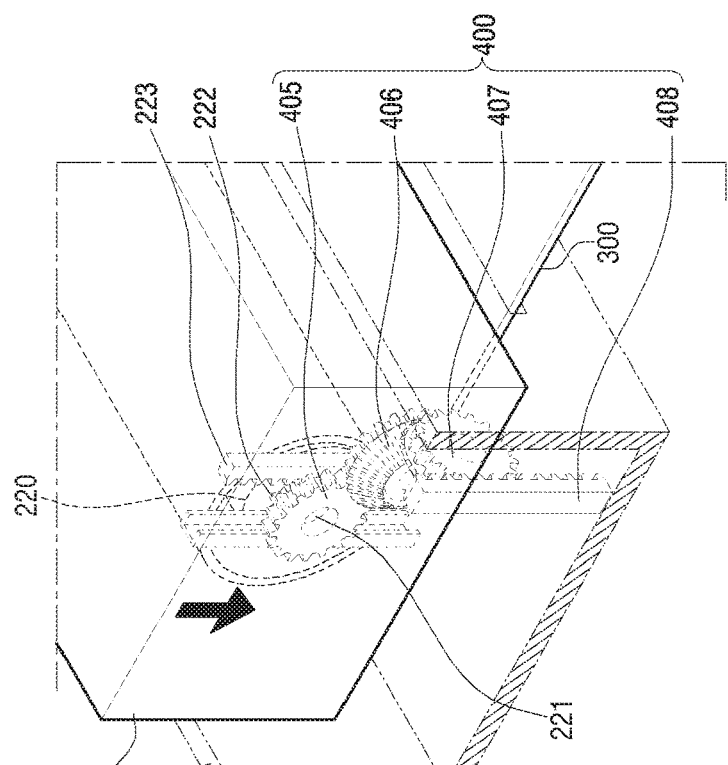
FIGS. 12A and 12B are side cross-sectional views illustrating examples of the housing reduced in size in accordance with guidance of a housing guide according to various embodiments of the present disclosure.

Referring to FIG. 12A, the flexible display 300 may be wound on the roll 220, and the flexible display 300 may be withdrawn from the housing 200 by the user as described above.

As the flexible display 300 is withdrawn from the housing 200, the center shaft 221 of the roll 220 may be rotated in the housing. In this case, as the center shaft 221 is rotated, the first center shaft gear 222 that is connected to the center shaft 221 may be rotated. The first center shaft gear 222 may be engaged with the center shaft rail 223 that is fixed to the upper portion 201 of the housing 200. The center shaft rail 223 may guide the movement path of the center shaft 221 so that the center shaft 221 itself moves for a distance (e.g., that is equal to or shorter than the height of the upper portion 201 of the housing 200), which may be predetermined, up the center shaft rail 223.

Further, if the withdrawal of the flexible display 300 is sensed, the housing guide 400 may guide the upper portion 201 of the housing 200 in a direction toward the center shaft 221 using a second center shaft gear 405, power transfer gears 406 and 407, and a housing rail 408 that is fixed to the lower portion 202 of the housing 200. For example, if the center shaft 221 is rotated, the second center shaft gear 405 that is connected to the center shaft 221 may be rotated. The power transfer gears 406 and 407 that are connected to the second center shaft gear 405 may be rotated. The power transfer gears 406 and 407 may transfer the power between the center shaft 221 and the housing rail 408. The power transfer gears 406 and 407 may control the number of revolutions, rotating speed, or rotating direction. The power transfer gears may include one or more gears or one or more belts. Further, the power transfer gears may include a combination of one or more gears and one or more belts.

Figure 12B:
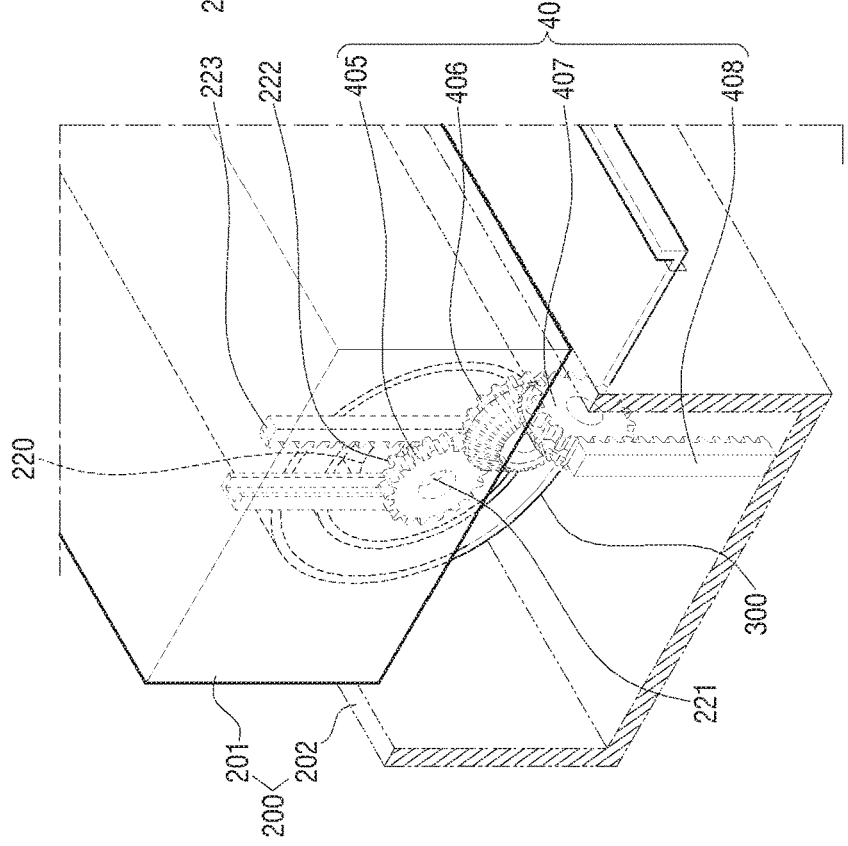

As shown in FIG. 12A, if the power transfer gear 406 is rotated, the power transfer gear 407 that is engaged with the power transfer gear 406 is rotated, and the upper portion 201 of the housing 200 may be guided in a direction toward the center shaft 221 along the housing rail 408 that is engaged with the power transfer gear 407 so that the size of the housing 200 is reduced. That is, if the center shaft 221 is rotated, the housing guide 400 may guide the upper portion 201 of the housing 200 in the direction toward the center shaft 221 so that the size of the housing 200 is reduced as shown in FIG. 12B by power transfer through the power transfer gears 406 and 407.

Figure 13A:
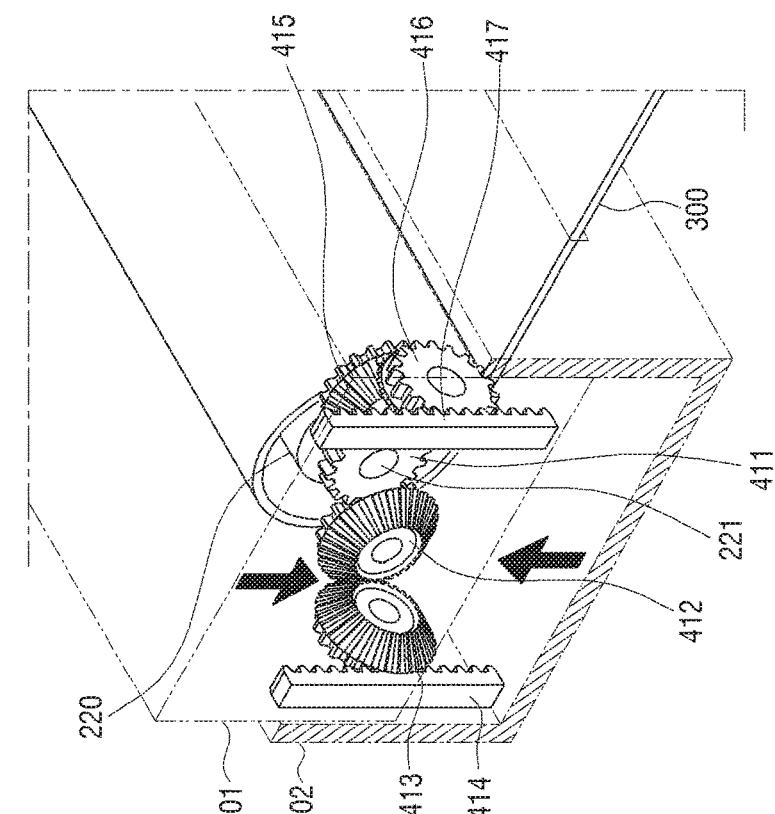
FIGS. 13A and 13B are side cross-sectional views illustrating examples of the housing reduced in size in accordance with guidance of a housing guide according to various embodiments of the present disclosure.

Referring to FIG. 13A, the flexible display 300 may be wound on the roll 220, and the flexible display 300 may be withdrawn from the housing 200 by the user as described above.

As the flexible display 300 is withdrawn from the housing 200, the housing guide may guide the upper portion 201 and the lower portion 202 of the housing 200 in the direction toward the center shaft 221 using constituent elements thereof, that is, a center shaft gear 411, first power transfer gears 412 and 413, second power transfer gears 415 and 416, and first and second housing rails 414 and 417 that are connected to the housing 200.

For example, as the flexible display 300 is withdrawn from the housing 200, the center shaft 221 of the roll 220 may be rotated in the housing. In this case, as the center shaft 221 is rotated, the center shaft gear 411 that is connected to the center shaft 221 may be rotated. The first power transfer gears 412 and 413 and the second power transfer gears 415 and 416, which are engaged with the center shaft gear 411, may be rotated. The first power transfer gears 412 and 413 and the second power transfer gears 415 and 416 may control the number of revolutions, rotating speed, or rotating direction. The first and second power transfer gears may include one or more gears or one or more belts. Further, the first and second power transfer gears may include a combination of one or more gears and one or more belts.

As shown in FIG. 13A, if the first gear 412 of the first power transfer gears 412 and 413 that are engaged with the center shaft gear 411 is rotated, the second gear 413 that is engaged with the first gear 412 is rotated, and the upper portion 201 of the housing 200 may be guided along the first housing rail 414 that is engaged with the second gear 413 so that the size of the housing 200 is reduced.

Figure 13B:
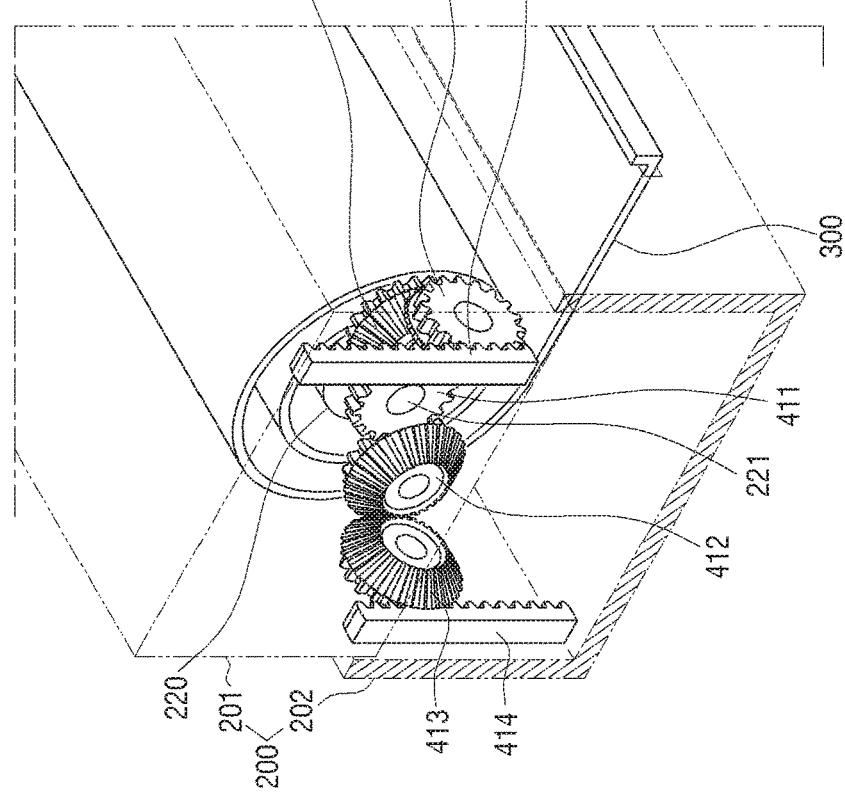

Further, if the first gear 415 of the second power transfer gears 415 and 416 that are engaged with the center shaft gear 411 is rotated, the second gear 416 that is engaged with the first gear 415 is rotated, and the lower portion 202 of the housing 200 may be guided along a second housing rail 417 that is engaged with the second gear 416 so that the size of the housing 200 is reduced. That is, if the center shaft 221 is rotated, the housing guide 400 may guide the upper portion 201 and the lower portion 202 of the housing 200 in the direction of the center shaft 221 so that the height and/or overall size of the housing 200 is reduced as shown in FIG. 13B, due to the power transfer using the first power transfer gears 412 and 413 and the second power transfer gears 415 and 416.

FIGS. 14, 15A and 15B, and 16A and 16B are views illustrating examples of sensing withdrawal or retraction of a flexible display in an electronic device according to various embodiments of the present disclosure.

Figure 14:
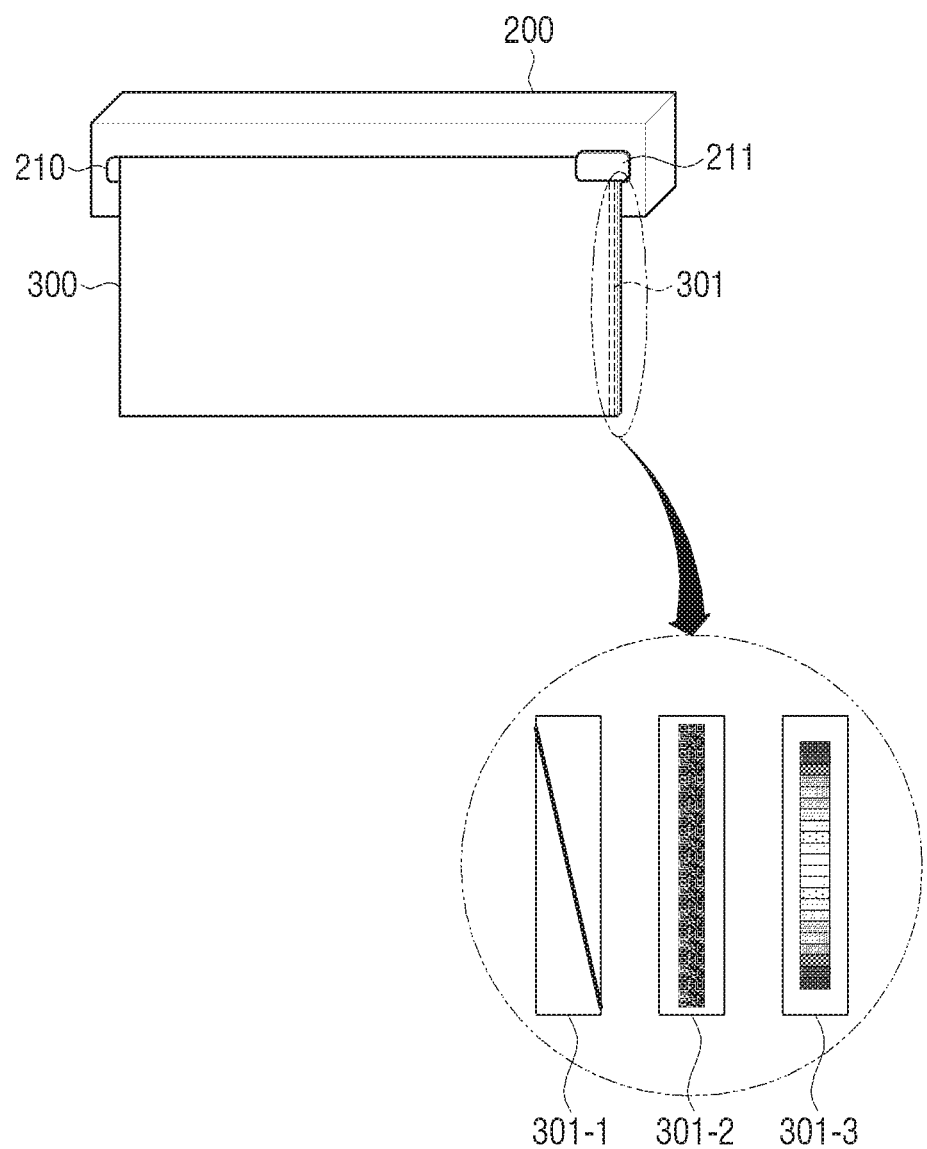
FIG. 14 is a view illustrating an example of sensing withdrawal and retraction of a flexible display in an electronic device according to various embodiments of the present disclosure.

Referring to FIG. 14, along one edge and on one side of the flexible display 300, a pattern 301 may be provided for indicating the withdrawal rate of the flexible display 300 but embodiments are not limited thereto. The patterns may be provided along both edges of the flexible display, on both sides of the flexible display, or in combinations thereof. Examples 301-1, 301-2, and 301-3 of the pattern 301 of the flexible display 300 are shown in the enlarged view of FIG. 14.

The opening 210 provided in the housing 200 of the electronic device, may include a scan portion 211 for sensing the pattern 301 as the flexible display 300 is withdrawn from the housing 200 or retracted into the housing 200. In the case where the flexible display 300 is withdrawn from the housing 200, the scan portion 211 may sense the pattern of the flexible display 300 and transmit the sensed pattern information to the processor 120. The processor 120 may calculate the withdrawal rate of the flexible display 300 on the basis of the transmitted pattern information. Further, on the basis of the calculated withdrawal rate of the flexible display 300, the processor 120 may control the housing guide to reduce the width, height and/or overall size of the housing 200 as described above.

Figure 15A:
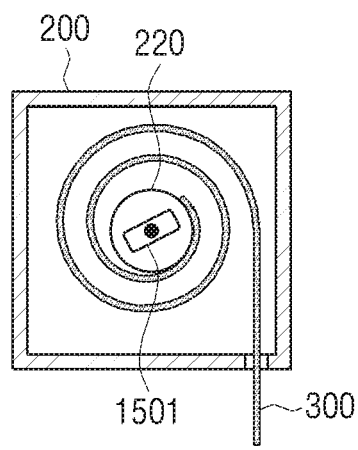
FIGS. 15A and 15B are views illustrating examples of sensing withdrawal and retraction of a flexible display in an electronic device according to various embodiments of the present disclosure.
Figure 15B:
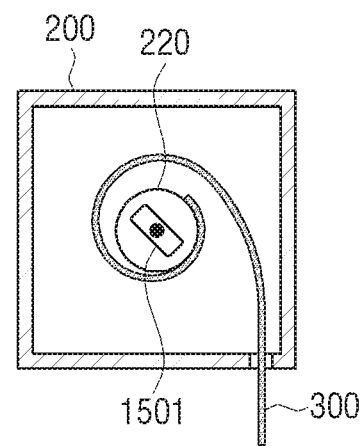

Referring to FIGS. 15A and 15B, a gyro sensor 1501 may be attached to the inside or the outside of the center shaft of the roll 220 on which the flexible display 300 is wound for sensing withdrawal or retraction of the flexible display in an electronic device. In the case where the flexible display 300 is withdrawn from the housing 200, the gyro sensor 1501 may sense the rotation rate of the roll 220 and transmit the sensed rotation information to the processor 120. For example, in the case where the electronic device is changed from a state as shown in FIG. 15A to a state as shown in FIG. 15B as the flexible display 300 is withdrawn from the housing 200, the gyro sensor 1501 may sense the rotation rate of the roll 220 in accordance with the changed state, and transmit the sensed rotation information to the processor 120. The processor 120 may calculate the withdrawal rate of the flexible display 300 on the basis of the transmitted rotation information. Further, on the basis of the calculated withdrawal rate of the flexible display 300, the processor 120 may control the housing guide 400 to reduce the height, width and/or overall size of the housing 200 as described above.

Referring to FIGS. 16A and 16B, a proximity sensor 1601 may be attached to one side of the housing 200 for sensing withdrawal or retraction of the flexible display in an electronic device. In the case where the flexible display 300 is withdrawn from the housing 200, the proximity sensor 1601 may sense a distance measured from one side of the housing 200 to the flexible display 300 on the roll 220, and transmit the sensed distance information to the processor 120. For example, in the case where the electronic device is changed from a state as shown in FIG. 16A to a state as shown in FIG. 16B as the flexible display 300 is withdrawn from the housing 200, the proximity sensor 1601 may sense the distance between the one side of the housing 200 and the remaining flexible display 300 on the roll 220 in accordance with the changed state, and transmit the sensed distance information to the processor 120. The processor 120 may calculate the withdrawal rate of the flexible display 300 on the basis of the transmitted distance information. Further, on the basis of the calculated withdrawal rate of the flexible display 300, the processor 120 may control the housing guide 400 to reduce the height, width and/or overall size of the housing 200 as described above.

FIGS. 17A to 17E and 18A to 18E are side cross-sectional views illustrating examples of a housing having a three-layer structure reduced in size as the roll moves. Further, FIGS. 19A to 19E, 20A to 20E, and 21A to 21E are side cross-sectional views illustrating examples of a housing having the three-layer structure reduced in size where the roll is fixed.

Figure 17A:
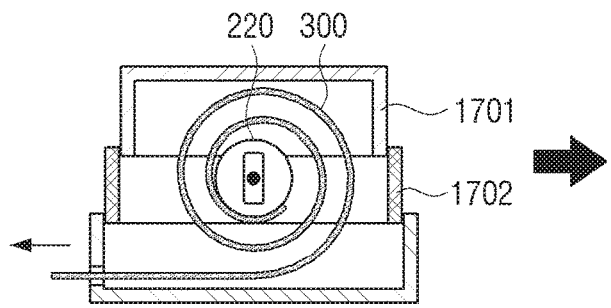
FIGS. 17A to 17E are side cross-sectional views illustrating examples of a housing reduced in size in accordance with guidance of a housing guide and a movable roll according to various embodiments of the present disclosure.
Figure 17B:
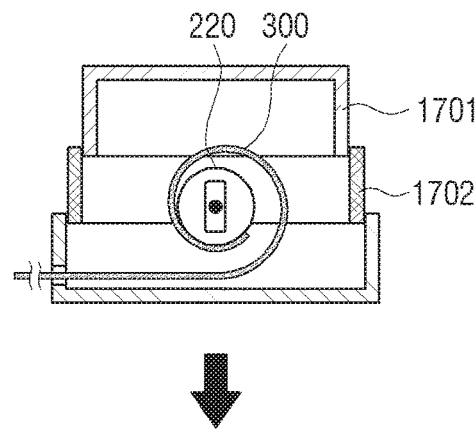

Referring to FIG. 17A, the flexible display 300 may be wound on the roll 220 in a multilayer structure as described above. If the flexible display 300 is rotated once to be unwound from the roll 220 as shown in FIG. 17B, the roll 220 itself may move into an empty space that is created on a lower side of the interior of the housing 200 through the withdrawal of the flexible display 300. In this case, as shown in FIG. 17C, a first upper portion 1701 and a second upper portion 1702 of the housing 200 are guided into the empty space on an upper side of the interior of the housing 200, and thus the height of the housing 200 can be reduced.

Figure 17D:
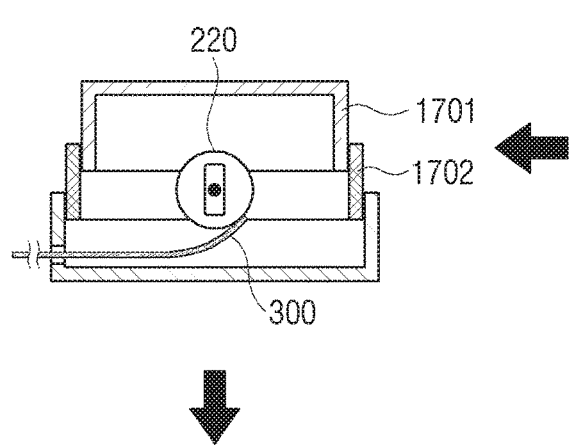
Figure 17C:
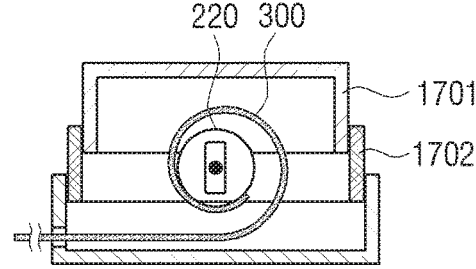
Figure 17E:
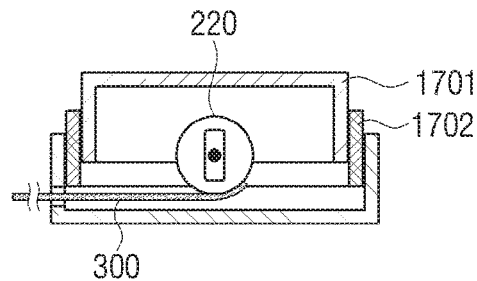

As shown in FIG. 17D, if the flexible display 300 is rotated once again to be further unwound from the roll 220, the roll 220 may move further into the empty space that is created on the lower side of the interior of the housing 200 through the withdrawal of the flexible display 300. In this case, as shown in FIG. 17E, the first upper portion 1701 and the second upper portion 1702 of the housing 200 are further guided into the empty space on the upper side of the interior of the housing 200, and thus the height and/or overall size of the housing 200 can be further reduced.

Figure 18A:
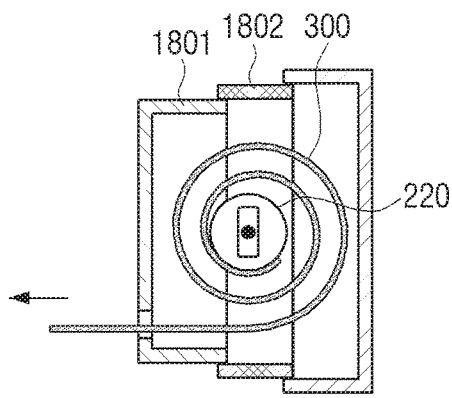
FIGS. 18A to 18E are side cross-sectional views illustrating examples of a housing reduced in size in accordance with guidance of a housing guide and a moveable roll according to various embodiments of the present disclosure.
Figure 18B:
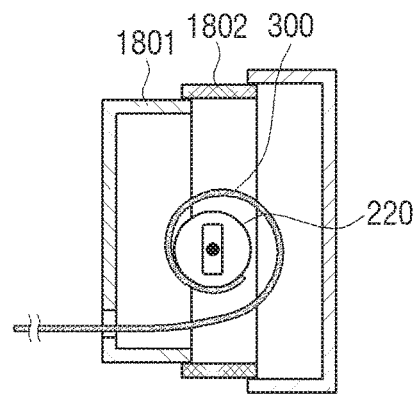

Referring to FIG. 18A, the flexible display 300 may be wound on the roll 220 in a multilayer structure as described above. If the flexible display 300 is rotated once to be unwound from the roll 220 as shown in FIG. 18B, the roll 220 itself may move into an empty space that is created on a right side of the interior of the housing 200 through the withdrawal of the flexible display 300. In this case, as shown in FIG. 18C, a first left portion 1801 and a second left portion 1802 of the housing are guided into the empty space on a left side of the interior of the housing, and thus the width of the housing can be reduced.

Figure 18D:
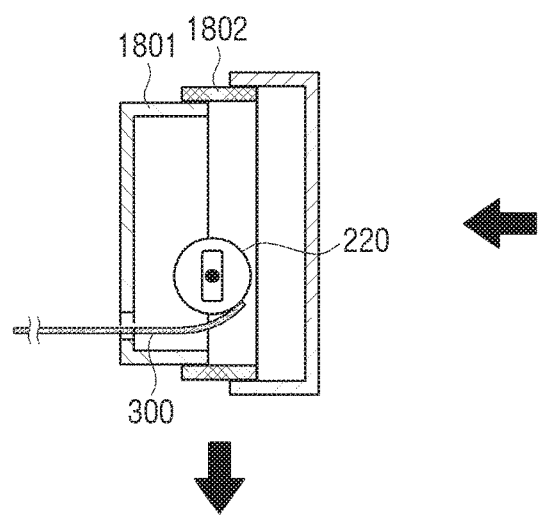
Figure 18C:
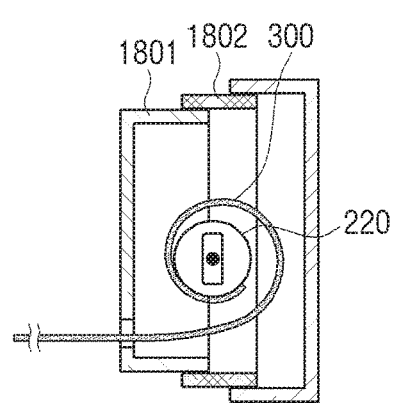
Figure 18E:
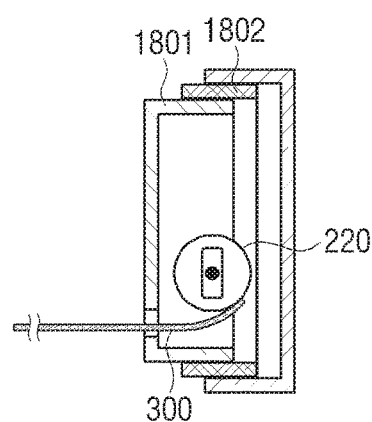

Referring to FIG. 18D, if the flexible display 300 is rotated once again to be further unwound from the roll 220, the roll 220 may move further into the empty space that is created on the right side of the interior of the housing through the withdrawal of the flexible display 300. In this case, as shown in FIG. 18E, the first left portion 1801 and the second left portion 1802 of the housing are guided into the empty space on the left side of the interior of the housing, and thus the width and/or overall size of the housing can be further reduced.

Figure 19A:
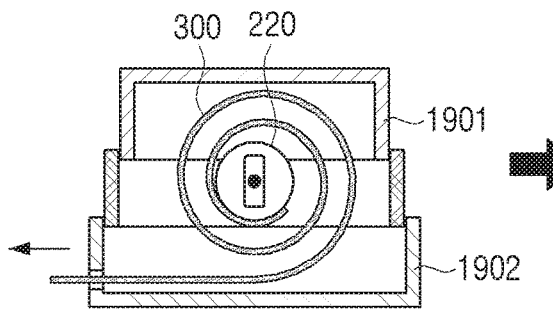
FIGS. 19A to 19E are side cross-sectional views illustrating examples of a housing reduced in size in accordance with guidance of a housing guide and a fixed roll according to various embodiments of the present disclosure.
Figure 19B:
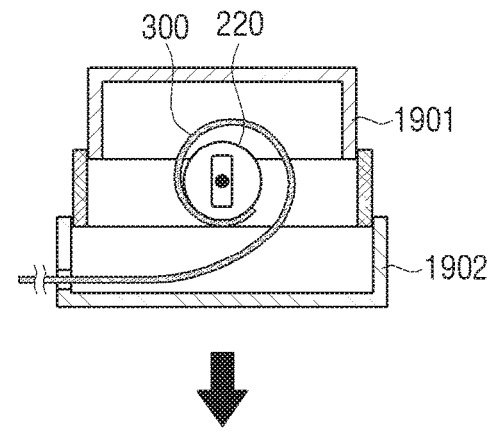

Referring to FIG. 19A, the flexible display 300 may be wound on the roll 220 in a multilayer structure as described above. The flexible display 300 may be rotated once to be unwound from the roll 220 as shown in FIG. 19B. In this case, as shown in FIG. 19C, in a state where the position of the roll 220 is fixed, an upper portion 1901 of the housing may be guided into the empty space on an upper side of the interior of the housing and a lower portion 1902 of the housing may be guided into the empty space on a lower side of the interior of the housing. Accordingly, the height of the housing can be reduced.

Figure 19D:
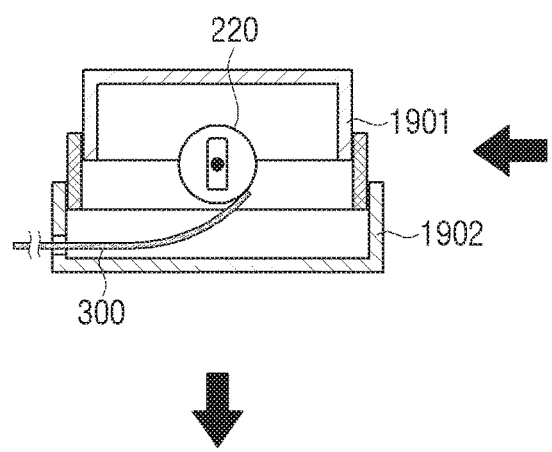
Figure 19C:
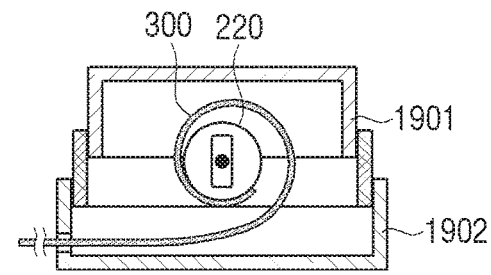
Figure 19E:
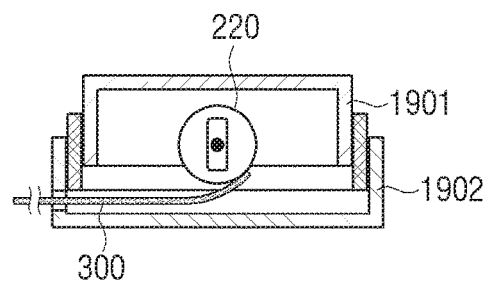

Referring to FIG. 19D, the flexible display 300 may be rotated once again to be further unwound from the roll 220. In this case, as shown in FIG. 19E, the upper portion 1901 of the housing may be further guided into the empty space on the upper side of the interior of the housing and the lower portion 1902 of the housing may be further guided into the empty space on the lower side of the interior of the housing. Accordingly, the height and/or overall size of the housing can be further reduced.

Figure 20A:
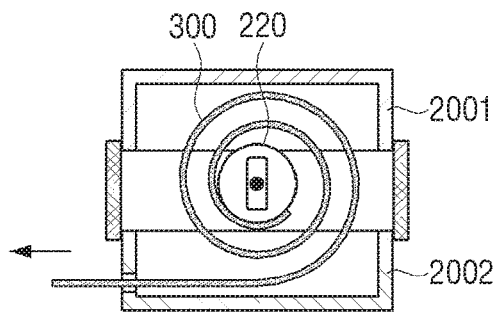
FIGS. 20A to 20E are side cross-sectional views illustrating examples of a housing reduced in size in accordance with guidance of a housing guide and a fixed roll according to various embodiments of the present disclosure.
Figure 20B:
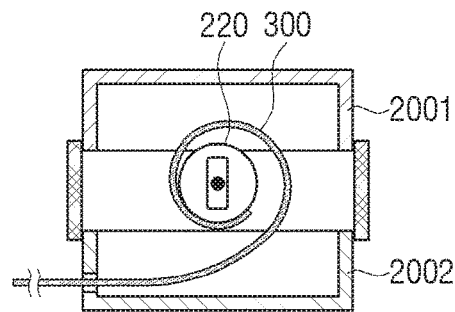

Referring to FIG. 20A, the flexible display 300 may be wound on the roll 220 in a multilayer structure as described above. The flexible display 300 may be rotated once to be unwound from the roll 220 as shown in FIG. 20B. In this case, as shown in FIG. 20C, in a state where the position of the roll 220 is fixed, an upper portion 2001 of the housing may be guided into the empty space on an upper side of the interior of the housing and a lower portion 2002 of the housing may be guided into the empty space on a lower side of the interior of the housing. Accordingly, the height of the housing can be reduced.

Figure 20D:
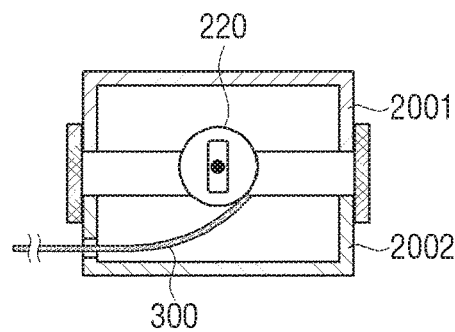
Figure 20C:
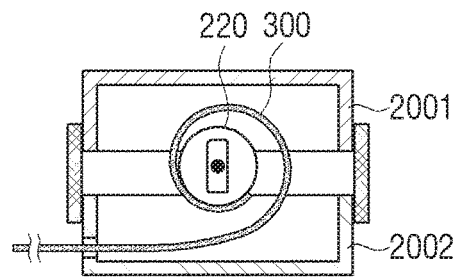
Figure 20E:
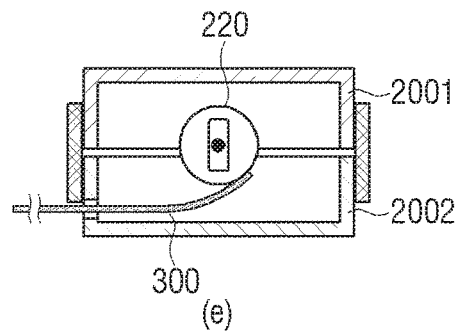

Referring to FIG. 20D, the flexible display 300 may be rotated once again to be further unwound from the roll 220. In this case, as shown in FIG. 20E, the upper portion 2001 of the housing may be further guided into the empty space on the upper side of the interior of the housing and the lower portion 2002 of the housing may be further guided into the empty space on the lower side of the interior of the housing. Accordingly, the height and/or overall size of the housing can be further reduced.

Figure 21A:
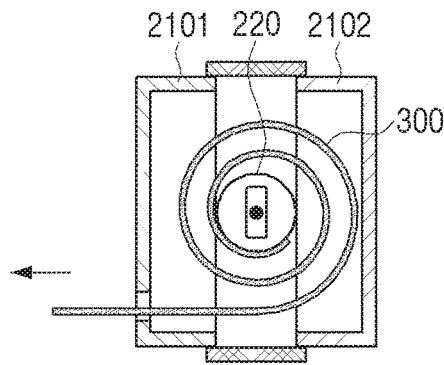
FIGS. 21A to 21E are side cross-sectional views illustrating examples of a housing reduced in size in accordance with guidance of a housing guide and a fixed roll according to various embodiments of the present disclosure.
Figure 21B:
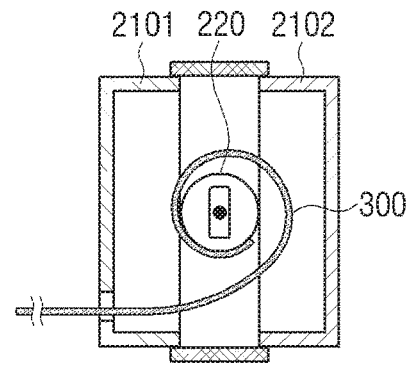

Referring to FIG. 21A, the flexible display 300 may be wound on the roll 220 in a multilayer structure as described above. The flexible display 300 may be rotated once to be unwound from the roll 220 as shown in FIG. 21B. In this case, as shown in FIG. 21C, in a state where the position of the roll 220 is fixed, a left portion 2101 of the housing may be guided into the empty space on a left side of the interior of the housing and a right portion 2102 of the housing may be guided into the empty space on a right side of the interior of the housing. Accordingly, the width of the housing can be reduced.

Figure 21D:
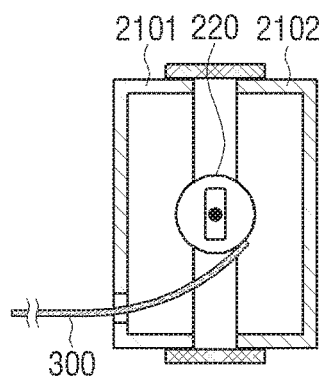
Figure 21C:
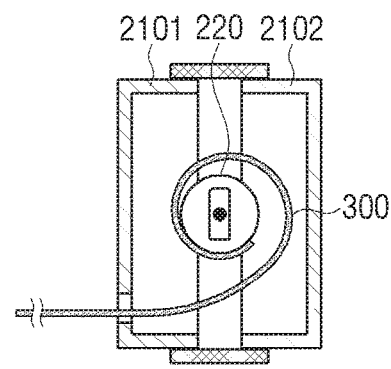
Figure 21E:
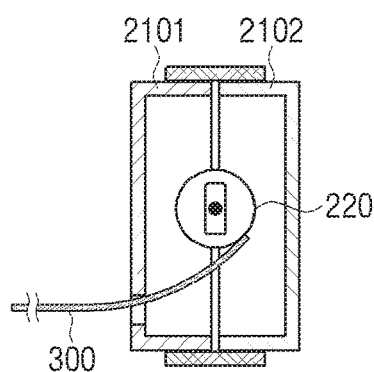

Referring to FIG. 21D, the flexible display 300 may be rotated once again to be further unwound from the roll 220. In this case, as shown in FIG. 21E, the left portion 2101 of the housing may be further guided into the empty space on the left side of the interior of the housing and the right portion 2102 of the housing may be further guided into the empty space on the right side of the interior of the housing. Accordingly, the width and/or overall size of the housing can be further reduced.

Although the housing 200 is described as having a rectangular shape for illustration purposes, the shape of the housing 200 is not limited thereto, and the housing 200 may have any number of various shapes within the scope of the present invention. For example, the housing 200 may have shapes including a cylinder, a rectangular prism, a hexagonal prism, and an octagonal prism. The general shape of the housing 200 is formed to be partially extended and retracted in consideration of the height, width and/or overall size of the general shape.

Each of the above-described constituent elements of the electronic device according to various embodiments of the present disclosure may be configured by one or more components, and the name of the corresponding constituent element may differ depending on the kind of the electronic device. The electronic device according to various embodiments of the present disclosure may be configured to include at least one of the above-described constituent elements, and may omit some constituent elements or may further include other additional constituent elements. Further, by combining some constituent elements of the electronic device according to various embodiments of the present disclosure to form one entity, functions of the corresponding constituent elements before being combined can be performed in the same manner.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device comprising:
   an external housing having an opening and comprising a first part and a second part;
   a roll, rotatably installed in a space created between the first part of the external housing and the second part of the external housing;
   a flexible display configured to:
      be wound on the roll, and
      be withdrawn through the opening in accordance with a rotating direction of the roll; and
   a housing guide configured to guide the first part of the external housing to slide into the second part of the external housing so that a size of the external housing is reduced as the flexible display is withdrawn through the opening.

2. The device of claim 1, wherein when the flexible display is withdrawn through the opening, the roll is configured to move a distance based on the empty space in the external housing created as the flexible display is withdrawn.

3. The device of claim 1, wherein the housing guide is further configured to guide the first part of the external housing in a direction toward the roll so that the size of the external housing is reduced.

4. The device of claim 1, wherein the housing guide is further configured to guide the first part of the external housing based on a withdrawal rate of the flexible display.

5. The device of claim 1, wherein the housing guide is further configured to guide the first part of the external housing based on the empty space in the external housing created as the flexible display is withdrawn.

6. The device of claim 1, wherein the housing guide is further configured to guide the first part of the external housing so that a height or a width of the external housing is reduced.

7. The device of claim 1,
wherein the roll further comprises a center shaft, and
wherein the housing guide further comprises:
    a center shaft gear, connected to the center shaft of the roll; and
    a rail fixed to the first part of the external housing, and configured to:
        guide the first part of the external housing in response to a rotation of the center shaft gear, and
        reduce the size of the external housing.

8. The device of claim 1, wherein the housing guide further comprises:
a pressure bar; and
a joint lever connected to the pressure bar,
wherein the pressure bar is configured to adjust a height of the joint lever when the flexible display is withdrawn, and
wherein the joint lever is configured to:
    guide the first part of the external housing; and
    reduce the size of the external housing.

9. The device of claim 1,
wherein the roll further comprises a center shaft, and
wherein the housing guide further comprises:
    a center shaft gear, connected to the center shaft of the roll; and
    a center shaft rail engaged with the center shaft gear, and configured to guide a movement of the roll when the flexible display is withdrawn.

10. The device of claim 1,
wherein the first part of the external housing comprises at least a first portion and a second portion that are separated from each other, and
wherein the first portion and the second portion are slidably connected by the housing guide.

11. The device of claim 1, wherein the housing guide is further configured to operate through reception of forward and backward rotating forces of the roll through a power transfer member.

12. The device of claim 1, further comprising:
a first sensor,
wherein a variable rate of the size of the external housing is based on a withdrawal rate of the flexible display or a rotation rate of the roll that is sensed by the first sensor.

13. The device of claim 1, further comprising:
a second sensor,
wherein a variable rate of the size of the external housing is based on a withdrawal rate of the flexible display that is calculated based on a detected distance between one side of the external housing and the flexible display on the roll that is sensed by the second sensor.

14. The device of claim 1, wherein the first part of the external housing has a multilayer structure comprising:
a first portion;
a second portion; and
a third portion,
wherein the first portion, second portion and third portion are successively arranged, and
wherein the housing guide is further configured to guide the first part of the external housing so that the first portion, second portion, and third portion of the housing overlap each other and reduce the size of the external housing through movement toward the roll as the flexible display is withdrawn.

15. An external housing of an electronic device, the external housing comprising:
a stationary external housing portion;
a movable external housing portion, slidably engaged with the stationary housing portion;
a roll, rotatably installed in a space created between the stationary external housing portion and the movable external housing portion; and
a housing guide configured to guide the movable external housing portion to slide into the stationary external housing portion according to rotation of the roll.

16. The external housing of claim 15, further comprising:
a flexible display disposed on the roll,
wherein the roll is further configured to rotate as the flexible display disposed thereon is withdrawn from the housing.

17. The external housing of claim 15, wherein the roll is further configured to move toward at least one of the stationary external housing portion and the movable external housing portion according to rotation of the roll.

* * * * *